US012460092B2

(12) United States Patent
Kisailus et al.

(10) Patent No.: US 12,460,092 B2
(45) Date of Patent: Nov. 4, 2025

(54) MULTIMODAL COATINGS FOR HEAT AND FIRE RESISTANCE

(71) Applicant: THE REGENTS OF THE UNIVERSITY OF CALIFORNIA, Oakland, CA (US)

(72) Inventors: David Kisailus, Riverside, CA (US); Ramya Mohan, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 756 days.

(21) Appl. No.: 17/259,475

(22) PCT Filed: Jul. 10, 2019

(86) PCT No.: PCT/US2019/041099
§ 371 (c)(1),
(2) Date: Jan. 11, 2021

(87) PCT Pub. No.: WO2020/014291
PCT Pub. Date: Jan. 16, 2020

(65) Prior Publication Data
US 2021/0253875 A1    Aug. 19, 2021

Related U.S. Application Data

(60) Provisional application No. 62/696,114, filed on Jul. 10, 2018.

(51) Int. Cl.
*C09D 5/18* (2006.01)
*B33Y 10/00* (2015.01)
(Continued)

(52) U.S. Cl.
CPC .............. *C09D 5/185* (2013.01); *B33Y 40/00* (2014.12); *C09D 5/002* (2013.01); *C09D 7/61* (2018.01);
(Continued)

(58) Field of Classification Search
CPC ........ C09D 7/63; C09D 5/002; C09D 105/00; C09D 129/04; C09D 133/20;
(Continued)

(56) References Cited

U.S. PATENT DOCUMENTS 5,401,793 A * 3/1995 Kobayashi ............. C09D 5/185
524/404
5,925,457 A * 7/1999 McGinniss ............ C09K 21/06
428/920
(Continued)

OTHER PUBLICATIONS

Ismail et al, "A Comprehensive Review on Phase Change Materials and Applications in Buildings and Components", ASME Open Journal of Engineering. (Year: 2022).*
(Continued)

*Primary Examiner* — Elizabeth M Imani
(74) *Attorney, Agent, or Firm* — Buchanan Ingersoll & Rooney PC

(57) ABSTRACT

A multimodal coating and method of coating a substrate are disclosed. The coating includes a structural framework; and a medium embedded in the structural framework forming an intumescent coating, the intumescent coating configured to undergo intumescent expansion of an outermost coating of the medium upon heating.

20 Claims, 36 Drawing Sheets

(51) Int. Cl.
*B33Y 40/00* (2020.01)
*C09D 5/00* (2006.01)
*C09D 7/61* (2018.01)
*C09D 7/63* (2018.01)
*C09D 105/00* (2006.01)
*C09D 129/04* (2006.01)
*C09D 133/20* (2006.01)
*C09D 161/06* (2006.01)
*C09D 197/00* (2006.01)

(52) U.S. Cl.
CPC ............ *C09D 7/63* (2018.01); *C09D 105/00* (2013.01); *C09D 129/04* (2013.01); *C09D 133/20* (2013.01); *C09D 161/06* (2013.01); *C09D 197/005* (2013.01); *B33Y 10/00* (2014.12)

(58) Field of Classification Search
CPC .... C09D 161/06; C09D 197/05; C09D 5/185; C09D 7/61; C09D 197/005; C09D 191/00; B33Y 40/00; B33Y 10/00; B32B 27/00
USPC .......................................................... 442/138
See application file for complete search history.

(56) References Cited

U.S. PATENT DOCUMENTS

2015/0004402 A1* 1/2015 Tarkin-Tas ........... C09D 163/00
521/85
2015/0174866 A1* 6/2015 Luinge .................... B32B 5/26
428/339

OTHER PUBLICATIONS

Dao et al., "Testing Fire Protective Performance of Intumescent Flexible Foam and Cork Material Used for High Pressure Composite Cylinders", Jun. 11, 2015.
International Search Report (PCT/ISA/210) issued on Dec. 18, 2019, by the US Patent Office as the International Searching Authority for International Application No. PCT/US2019/041099.
Powell et al., "Low-Temperature Solid-State Phase Transformation", Nasa Technical Note, Mar. 31, 1972.
Silicon carbide. Wikipedia, Dec. 26, 2017, retrieved on Oct. 8, 2019, retrieved from internet, URL: "https://en.wikipedia.php?title=Silicon_carbide&oldid=817185205".
Written Opinion (PCT/ISA/237) issued on Dec. 18, 2019, by the US Patent Office as the International Searching Authority for International Application No. PCT/US2019/041099.

* cited by examiner

FIG. 29 Extra Growths on Platelet

MULTIMODAL COATINGS FOR HEAT AND FIRE RESISTANCE

CROSS-REFERENCE TO RELATED APPLICATION

This application is a U.S. National Stage of Application No. PCT/US2019/41099, filed Jul. 10, 2019, which claims priority to U.S. Provisional Application No. 62/696,114, filed Jul. 10, 2018, the entire content of both of which is incorporated herein by reference.

STATEMENT OF GOVERNMENT INTEREST

This invention was made with government support from the Air Force Office of Scientific Research, contract #FA9550-15-1-0009, and National Institute of Justice, contract #2016-R2-CX-0015. The government has certain rights in this invention.

TECHNICAL FIELD

The disclosure relates to multimodal coatings for heat and fire resistance.

BACKGROUND

Many materials are subjected to extreme thermal or fire-based stresses along with mechanical loads, resulting in catastrophic failure within seconds to minutes, give off noxious gases and lead to death or severe destruction. Current protective coatings or materials are incapable of prolonged shielding and maintaining structural integrity at temperatures above 600° C. and/or are made using environmentally unfriendly methods. For example, materials used in aircraft fuselages are extremely brittle ceramic panels and foams, easily degradable carbon composites and aromatic hydrocarbon-based polymers such as polyimides, all of which provide minimal protection against fires or thermal stresses and/or can be costly to synthesize. Damage to these materials is often catastrophic, leading to significant loss of time, money and in many cases, life.

In some applications, coatings are applied to surfaces to reduce damage through adding an extra layer of protection. These coatings are either ablative, intumescent, or thick ceramic cements. Ablative coatings are the current state-of-the-art in aircraft and rocket nozzles; however, they lack the ability to provide prolonged protection in hostile environments. Thick ceramic cementitious layers are often bulky, crack easily when subjected to mechanical stresses, and are prone to distortion and softening due to thermal creep stresses. Intumescent polymer coatings with clay and ceramic additives, producing insulating char by limiting through-thickness thermal transport is currently being investigated. However, the challenges with this technique are poor surface adherence of the coating, the presence of toxic bio-accumulators such as halogens and bromines that are environmentally unfriendly. In addition, the char produced post-fire has poor mechanical resistance to abrasion and humidity, and oftentimes results in ash, presenting long-term durability issues.

SUMMARY

In view of the above, it would be desirable to develop coatings/materials that are specifically architected to provide thermal protection by absorbing significant amounts of energy from the fire/heat, while being mechanically operational at hostile temperatures.

In accordance with an exemplary embodiment, a multimodal coating is disclosed, the coating comprising: a structural framework; and a medium embedded in the structural framework forming a intumescent coating, the intumescent coating configured to undergo intumescent expansion of an outermost coating of the medium upon heating.

In accordance with another exemplary embodiment, a method is disclosed of coating a substrate, the method comprising: generating a structural framework; and embedding a medium in the structural framework forming an intumescent coating, and wherein the intumescent coating is configured to undergo intumescent expansion of an outermost coating of the medium upon heating.

In accordance with a further exemplary embodiment, a method is disclosed of coating a substrate, the method comprising: applying an organic with a decomposition temperature tuned between 110° C. to 1000° C. to a substrate; and adding a waxy layer on an upper surface of the organic, and wherein the organic forms an inner layer, and wherein upon exposure to heat, the inner layer will decompose and outgas, while the waxy layer soften and enables expansion to afford formation of interlayers of pores filled with gas to reduce thermal conduction.

DRAWINGS

Figure 4:
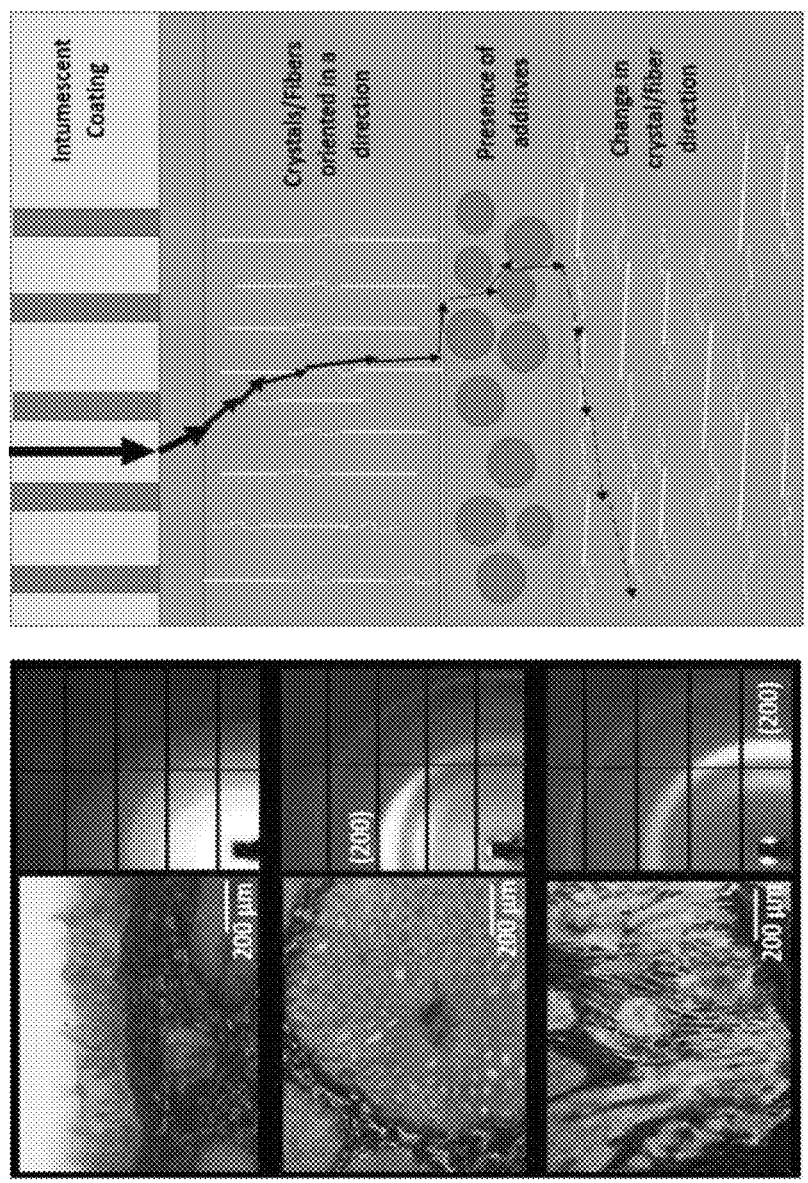

FIG. 4 is an imaging showing the optical micrographs and their corresponding wide-angle scattering images of each layer within the follicle valve (left image), and the schematic on the right shows a similarly proposed multi-layered anisotropic composite, and wherein the black arrow indicates a phonon wave that starts out strongly but as it encounters varying crystal orientations, interfaces, and particulate/porous architectures, it weakens in intensity and maps out a convoluted pathway.

Figure 5:
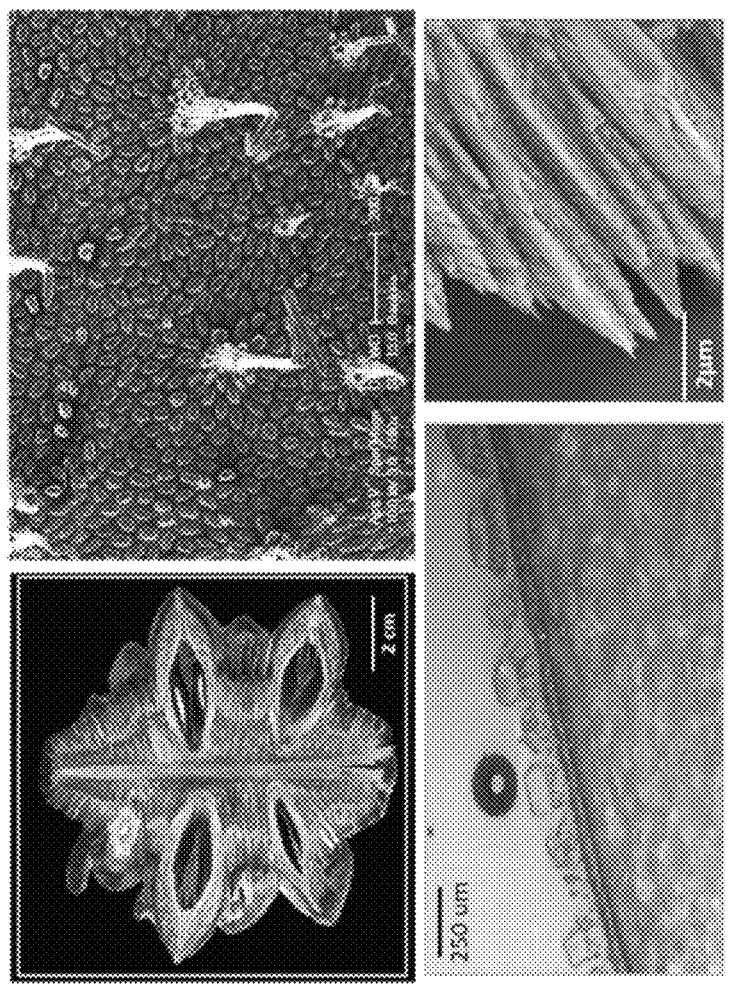

FIG. 5 are images showing the mineral coating on the surface of the seed, and wherein the top right image is a top-view of the surface of the seed; the bottom-left image is a cross-section showing the location of the seed coating above an organic substrate containing vital plant organic; and the bottom-right image is an etched seed mineral platelet showing the seed crystals in an oriented attachment.

Figure 6:

FIG. 6 is an image of a fire in accordance with an exemplary embodiment.

Figure 7:
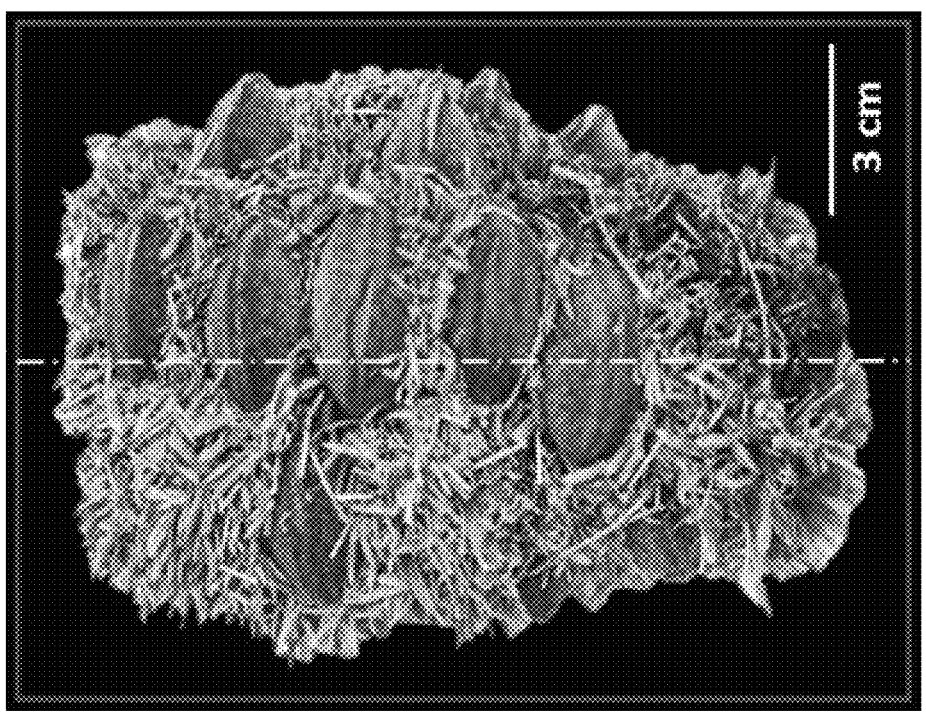

FIG. 7 is an image of a *Banksia Speciosa* cone.

Figure 8:
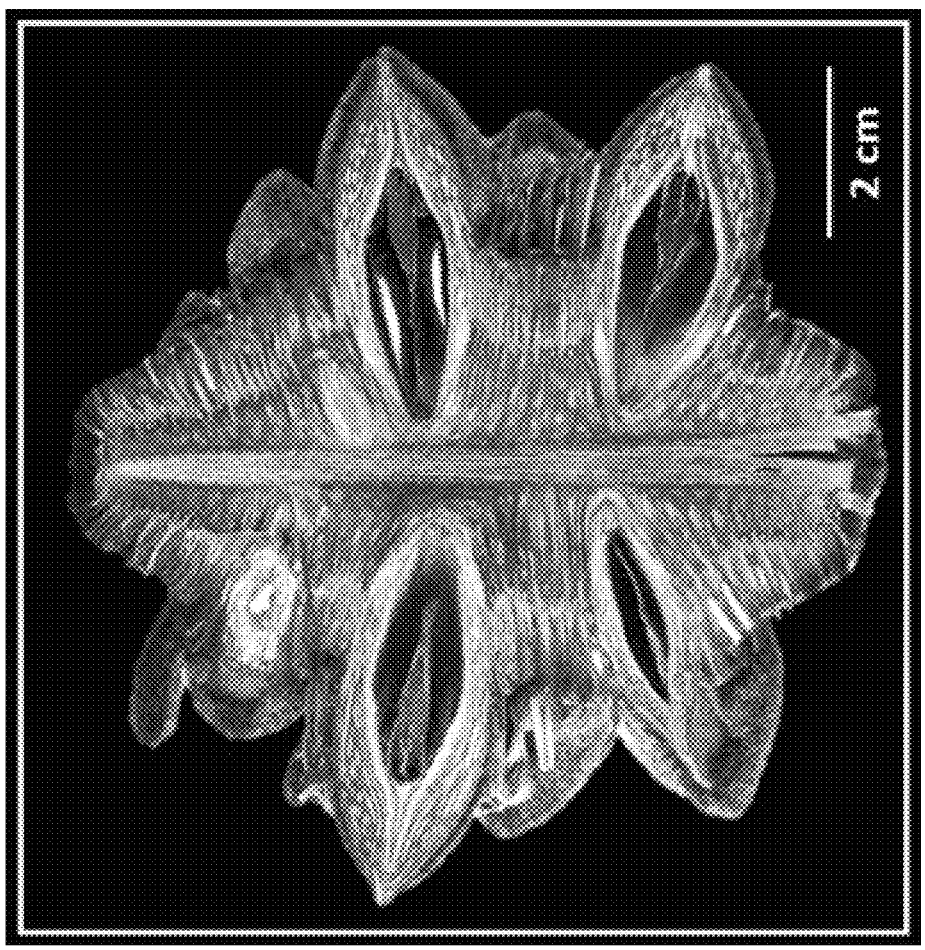

FIG. 8 is an image of an inner cross-section of the *Banksia Speciosa* cone revealing the inner structure in accordance with an exemplary embodiment.

Figure 9:
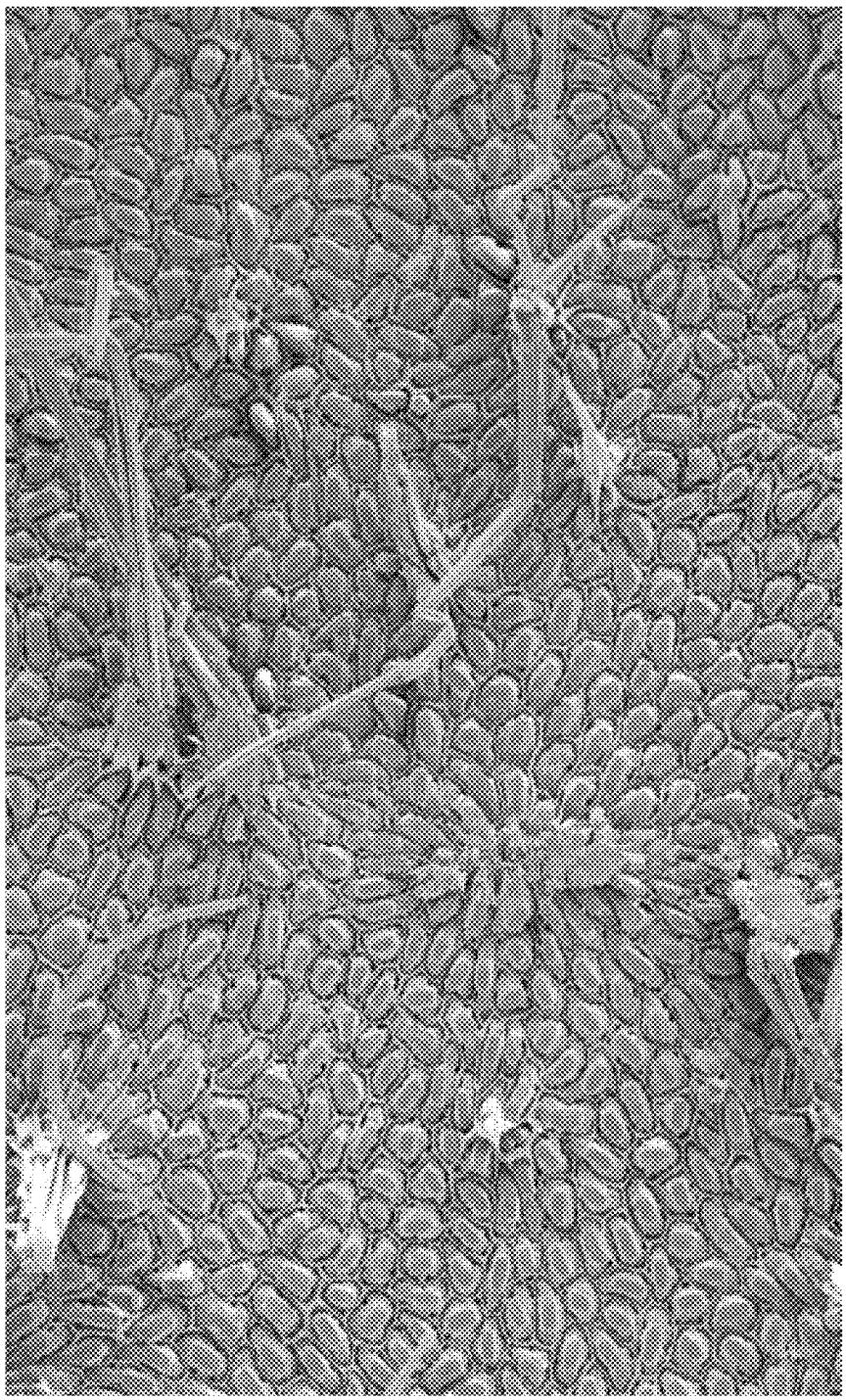

FIG. 9 is a Scanning Electron Microscopy (SEM) image of Species 1 of a *Banksia Speciosa* cone.

Figure 10:
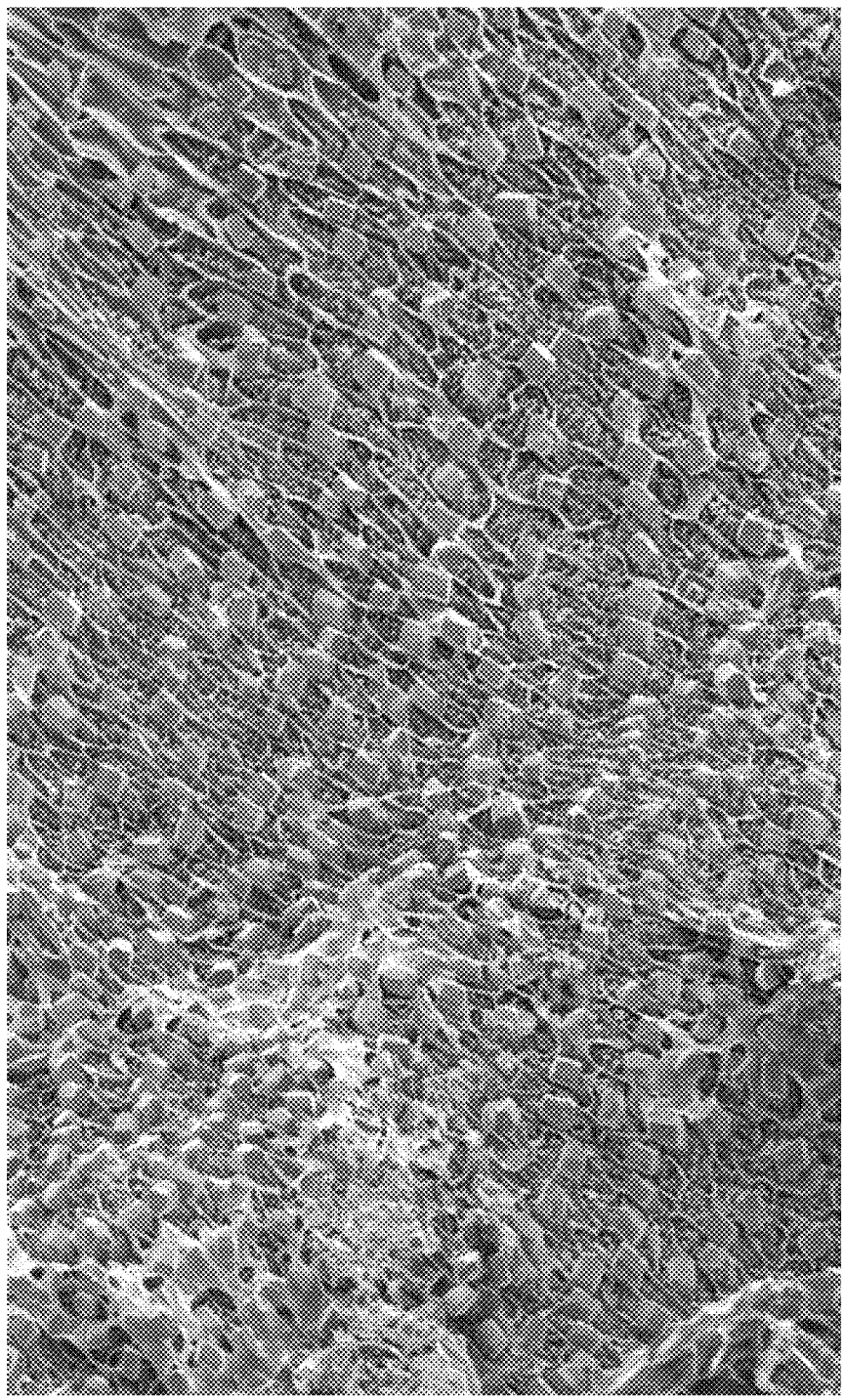

FIG. 10 is a Scanning Electron Microscopy (SEM) image of Species 2 of a *Banksia Speciosa* cone.

Figure 11B:
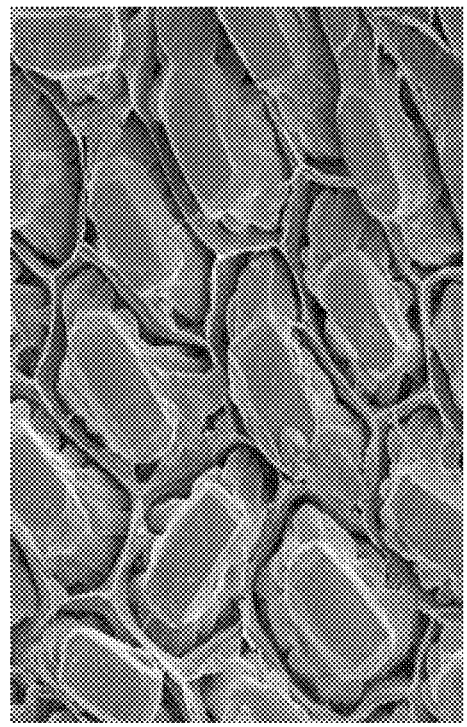
Figure 11A:
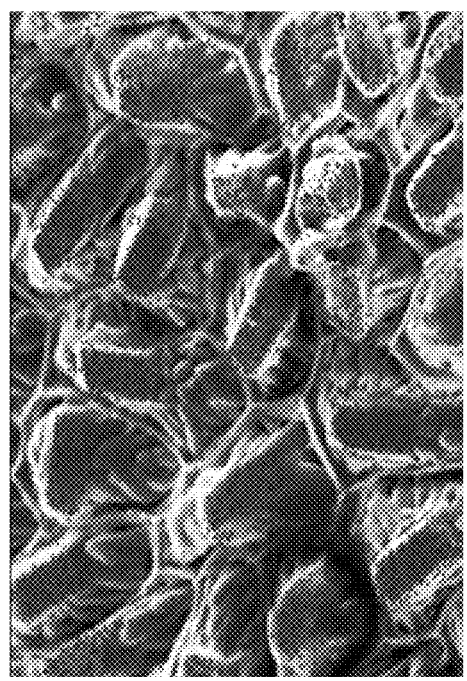

FIGS. 11A and 11B are a Ca map and SEM image of Species 1.

Figure 12A:
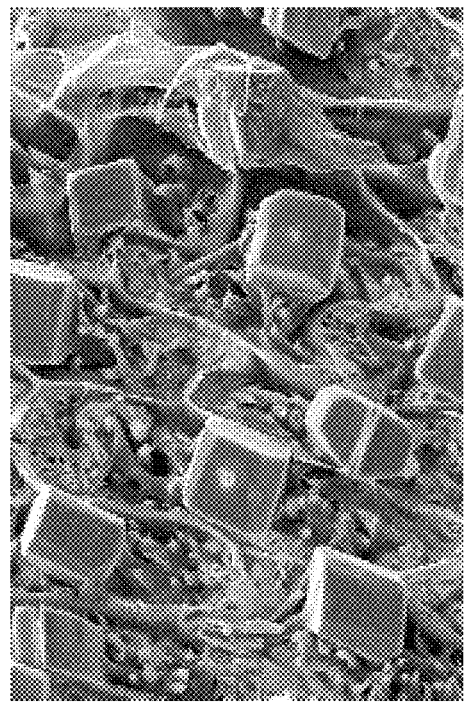
Figure 12B:
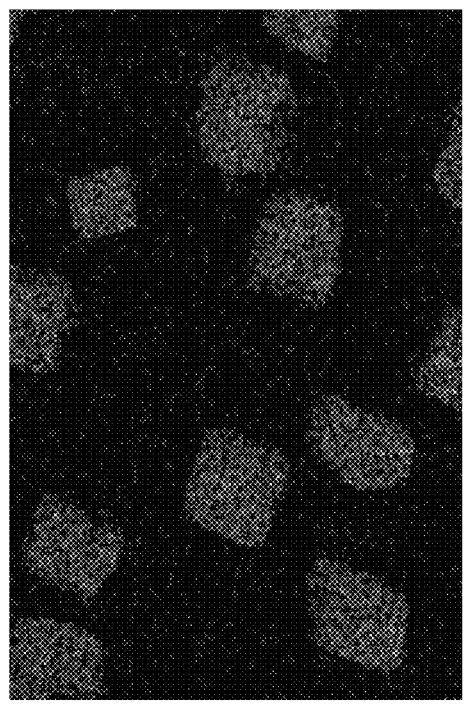

FIGS. 12A and 12B are a Ca map and SEM image of Species 2.

Figure 13:
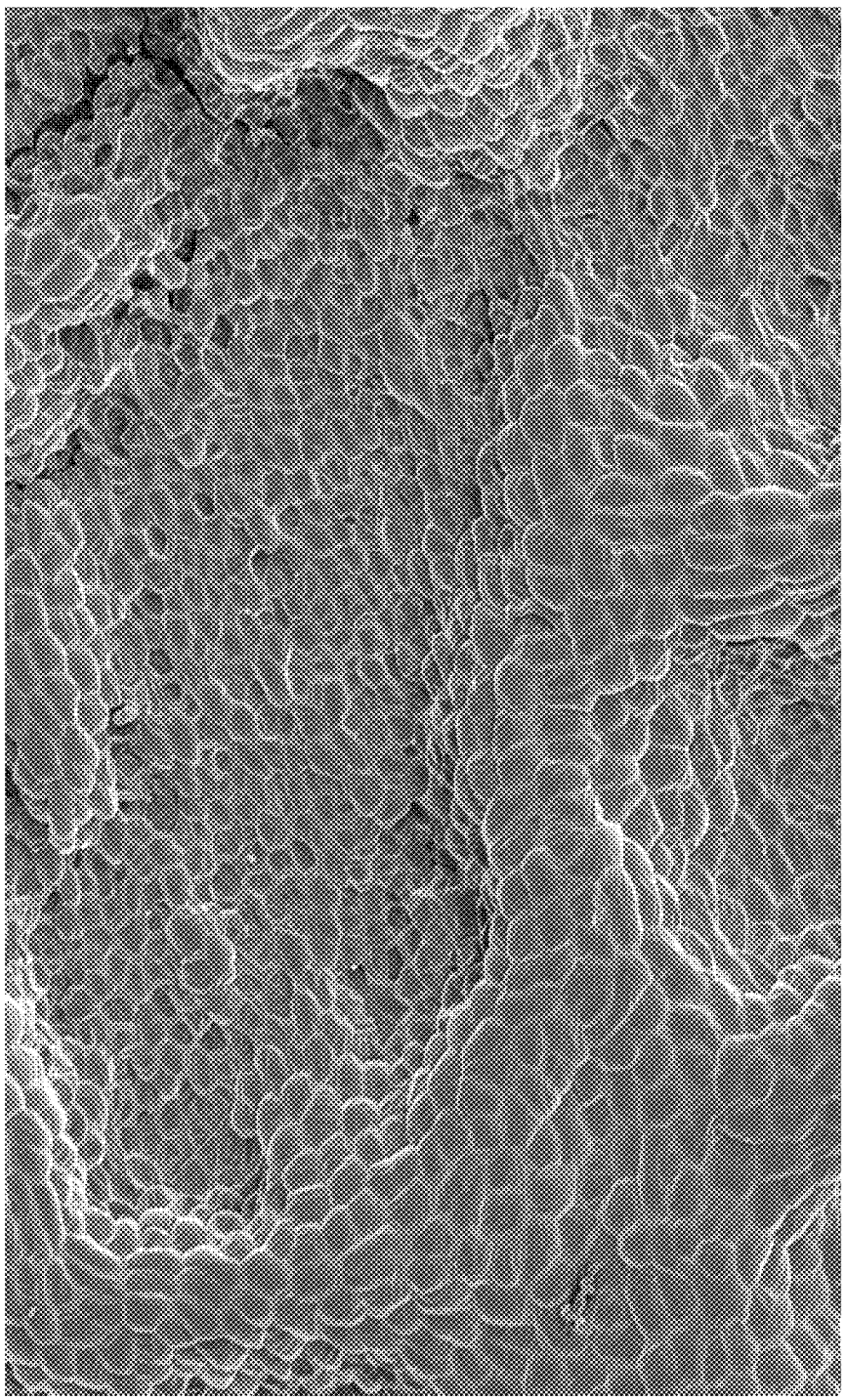

FIG. 13 is a SEM image of a Non-Pyrophyte species of a *Banksia Speciosa*.

Figure 14B:
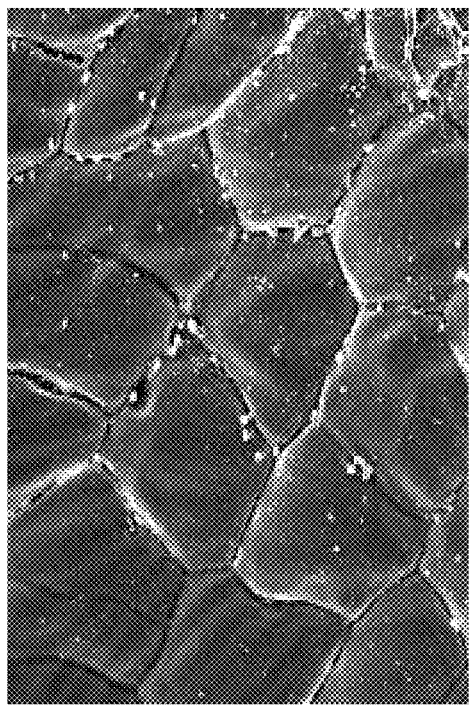
Figure 14A:
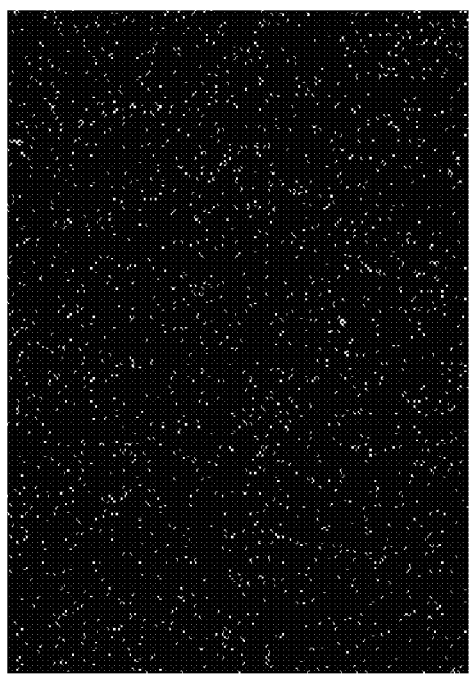

FIGS. 14A and 14B are charts illustrating a map of Ca intensity (a.u.) for Non-Pyrophytic Species, Species 1, and Species 2 in accordance with an exemplary embodiment.

Figure 15:
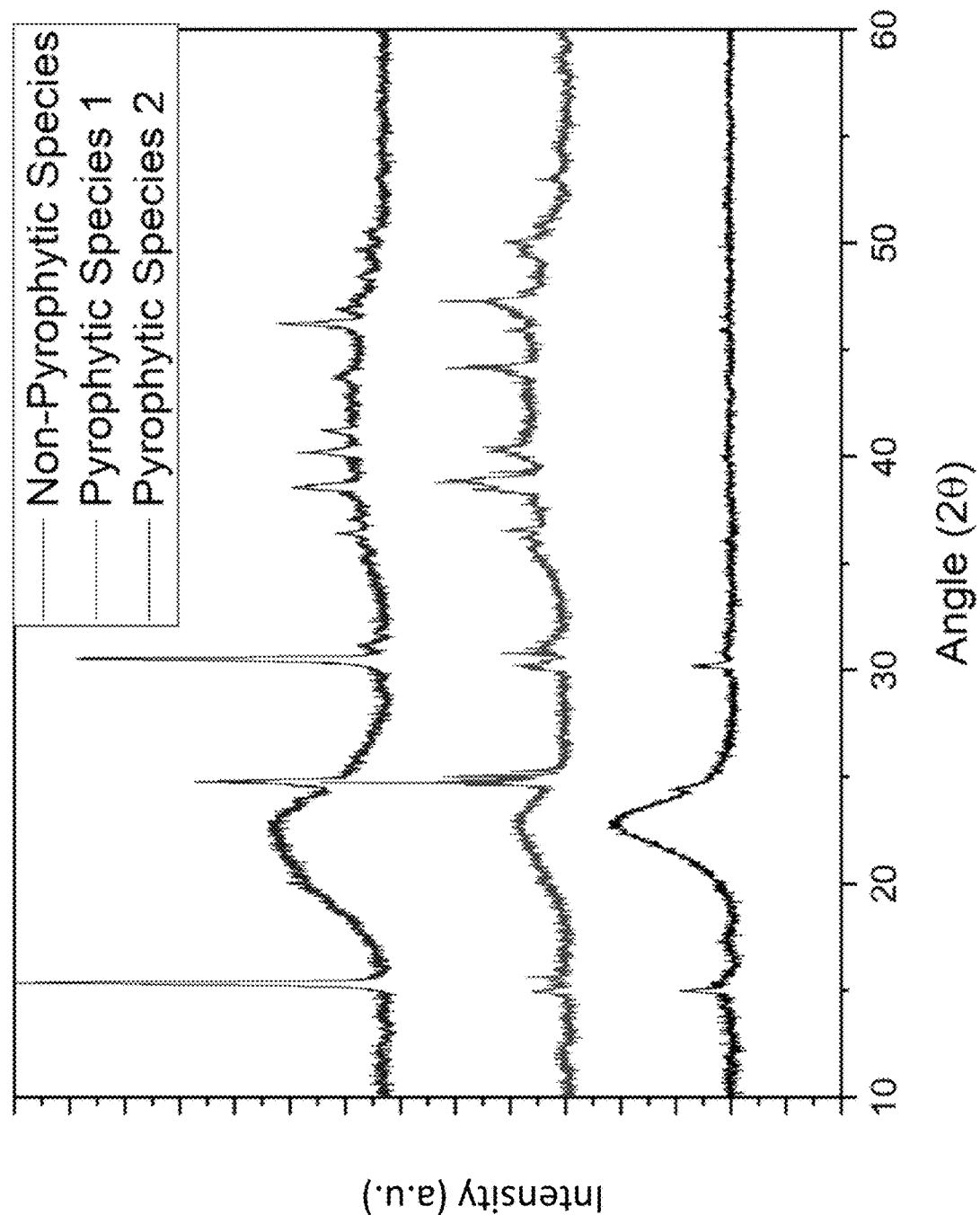

FIG. 15 are X-ray diffraction patterns of a (i) non-pyrophytic, (ii) Pyrophytic Seed—Species 1 and (iii) Pyrophytic Seed—Species 2.

Figure 16:
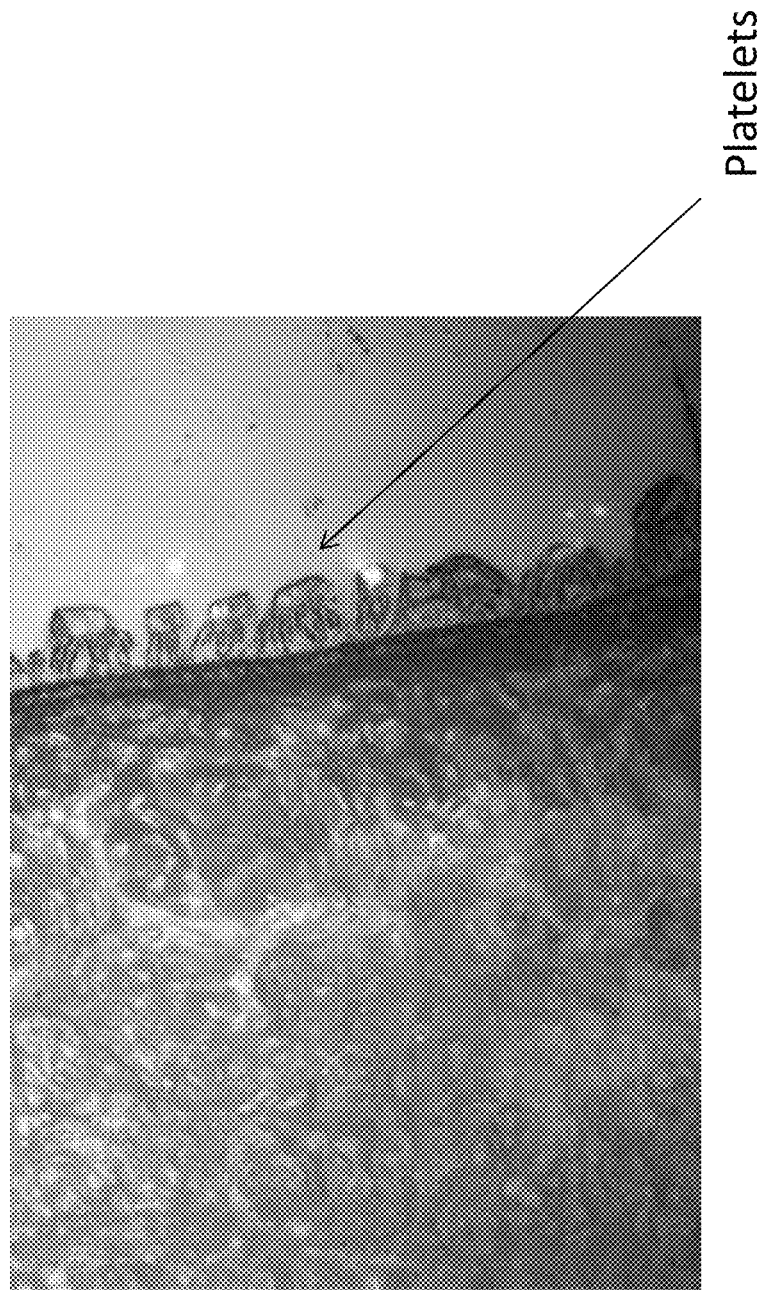

FIG. 16 is an optical image of a cross-section of a Pyrophytic Seed, Species 1.

Figure 17:
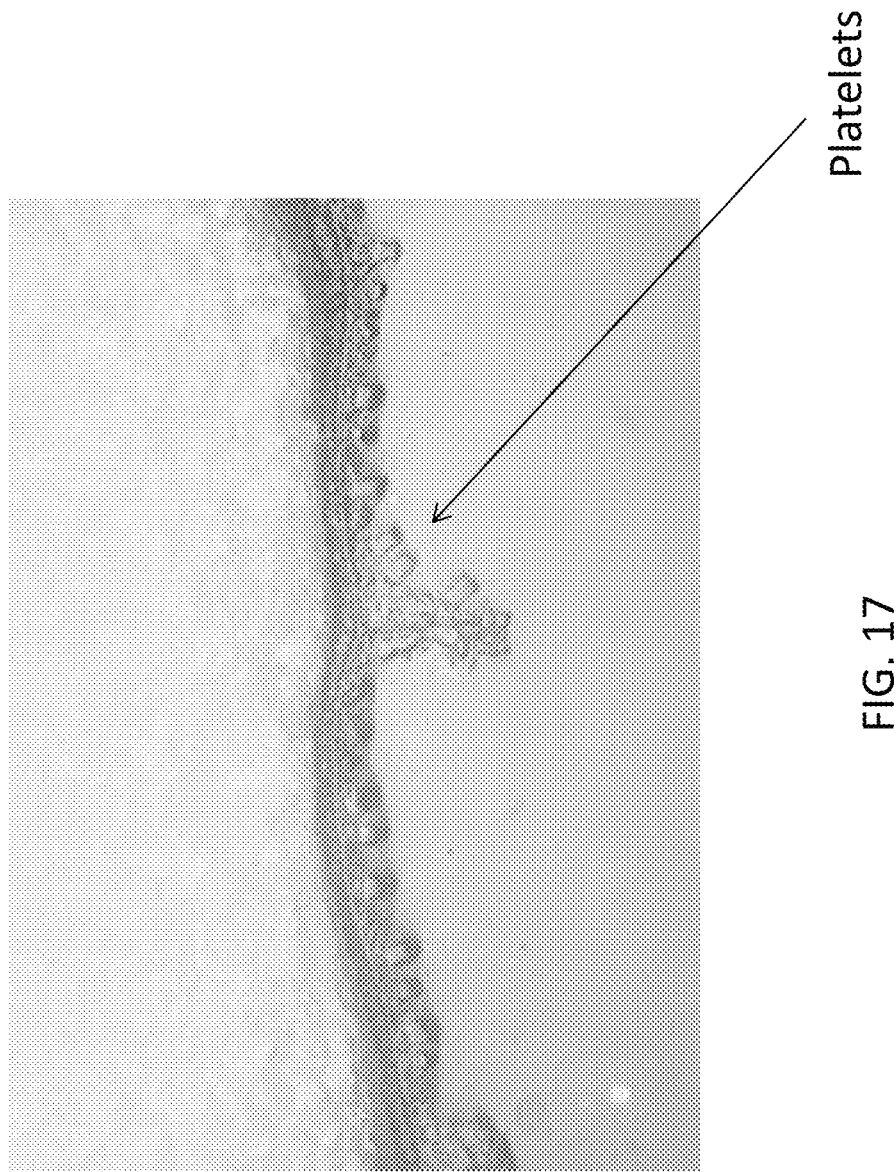

FIG. 17 is an optical image of a cross-section of a Pyrophytic Seed, Species 2.

Figure 18:
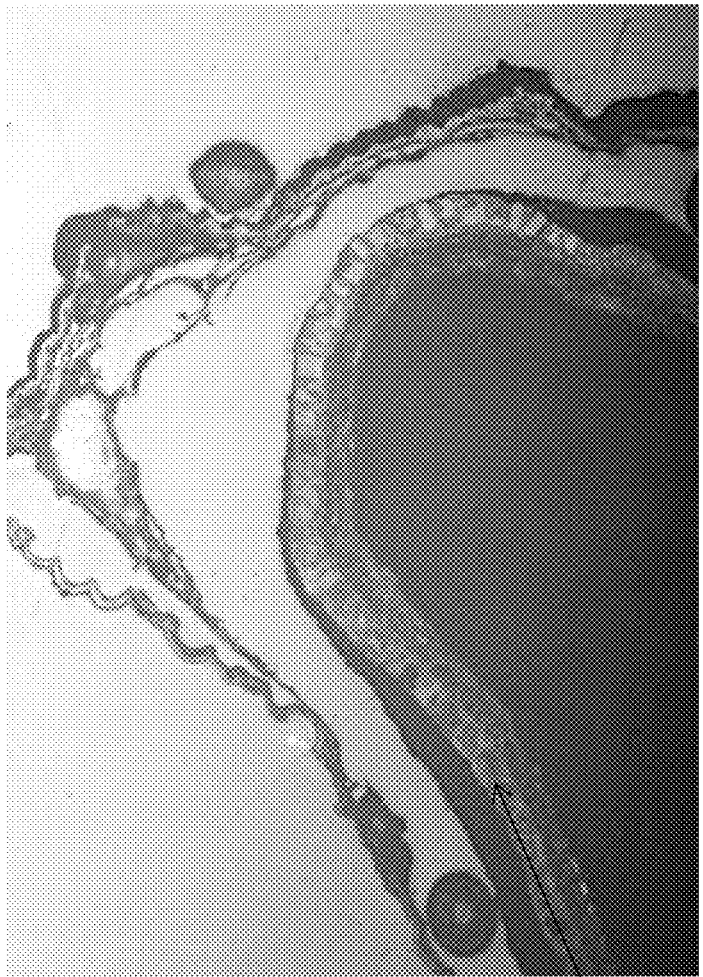

FIG. 18 is an optical image of a cross-section of a Non-Pyrophytic Seed.

Figure 19:
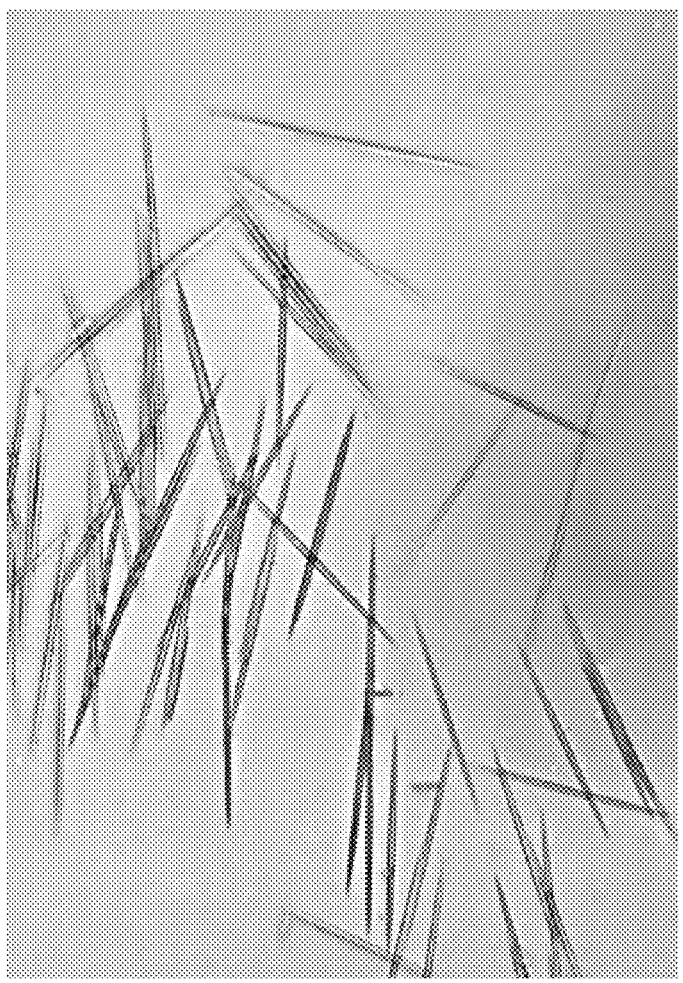

FIG. 19 is an image of Raphide morphology in accordance with an exemplary embodiment.

Figure 20:
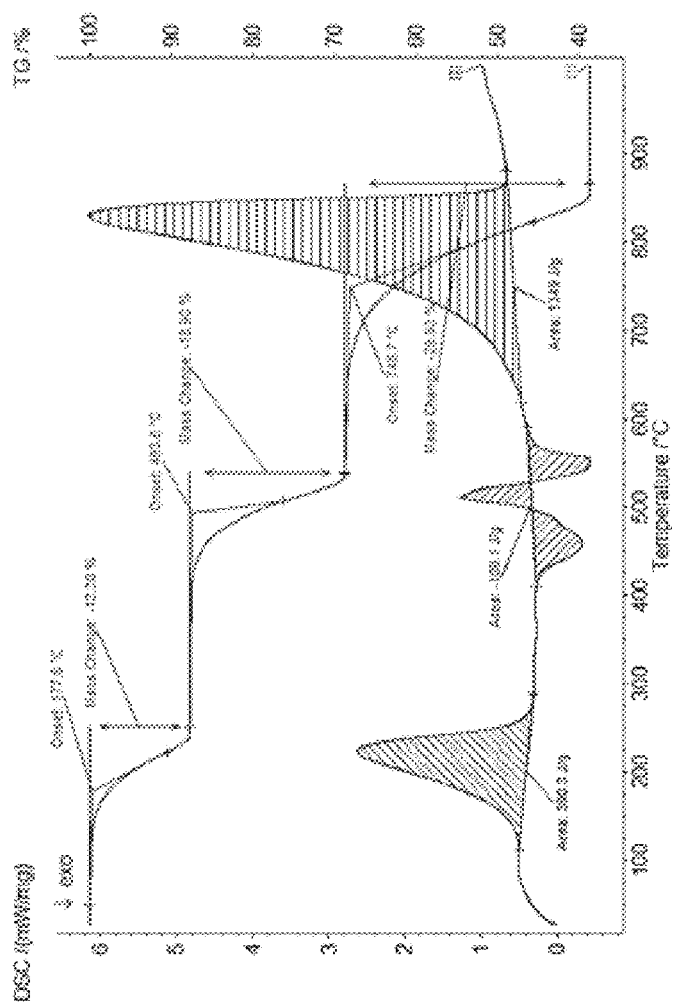

FIG. 20 is a chart illustrating Calcium Oxalate Monohydrate TGA in accordance with an exemplary embodiment.

Figure 21:
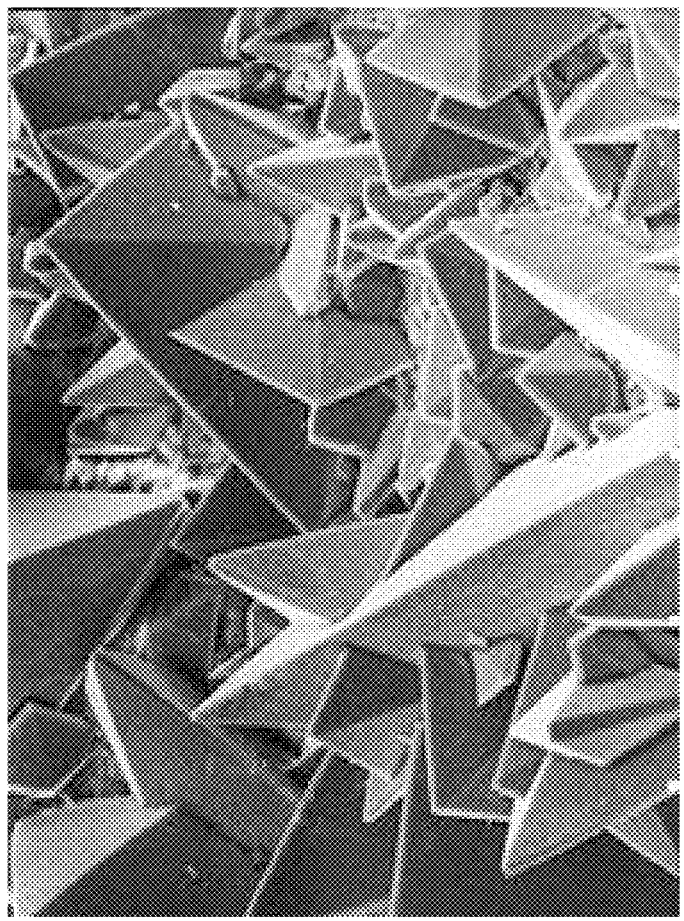

FIG. 21 is an SEM image of a Monoclinic Crystal Morphology in accordance with an exemplary embodiment.

Figure 22:
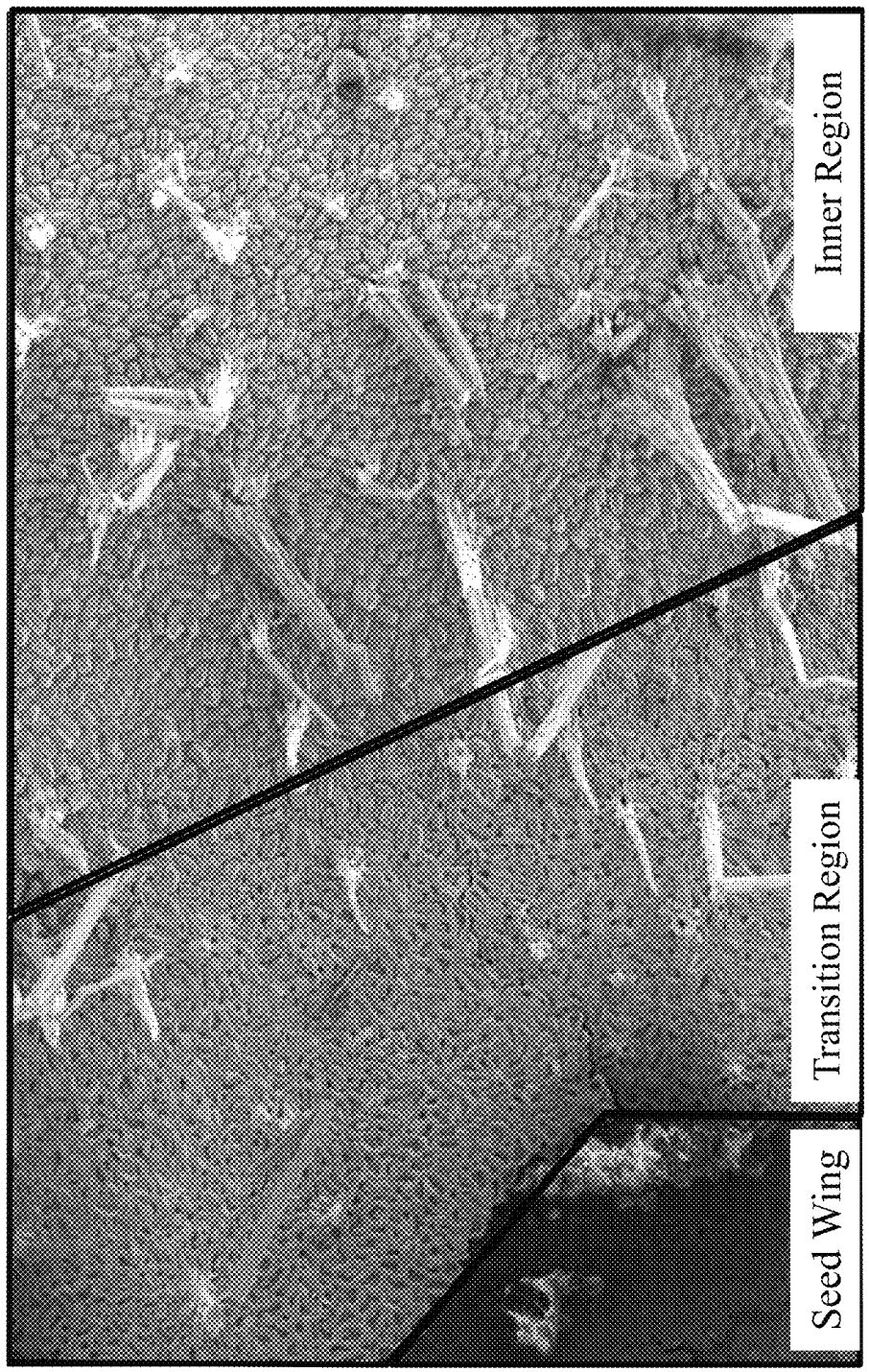

FIG. 22 is an image showing platelet growth of a Seed Wing (Left), Transition Region (Middle) and Inner Region (Right).

Figure 23:
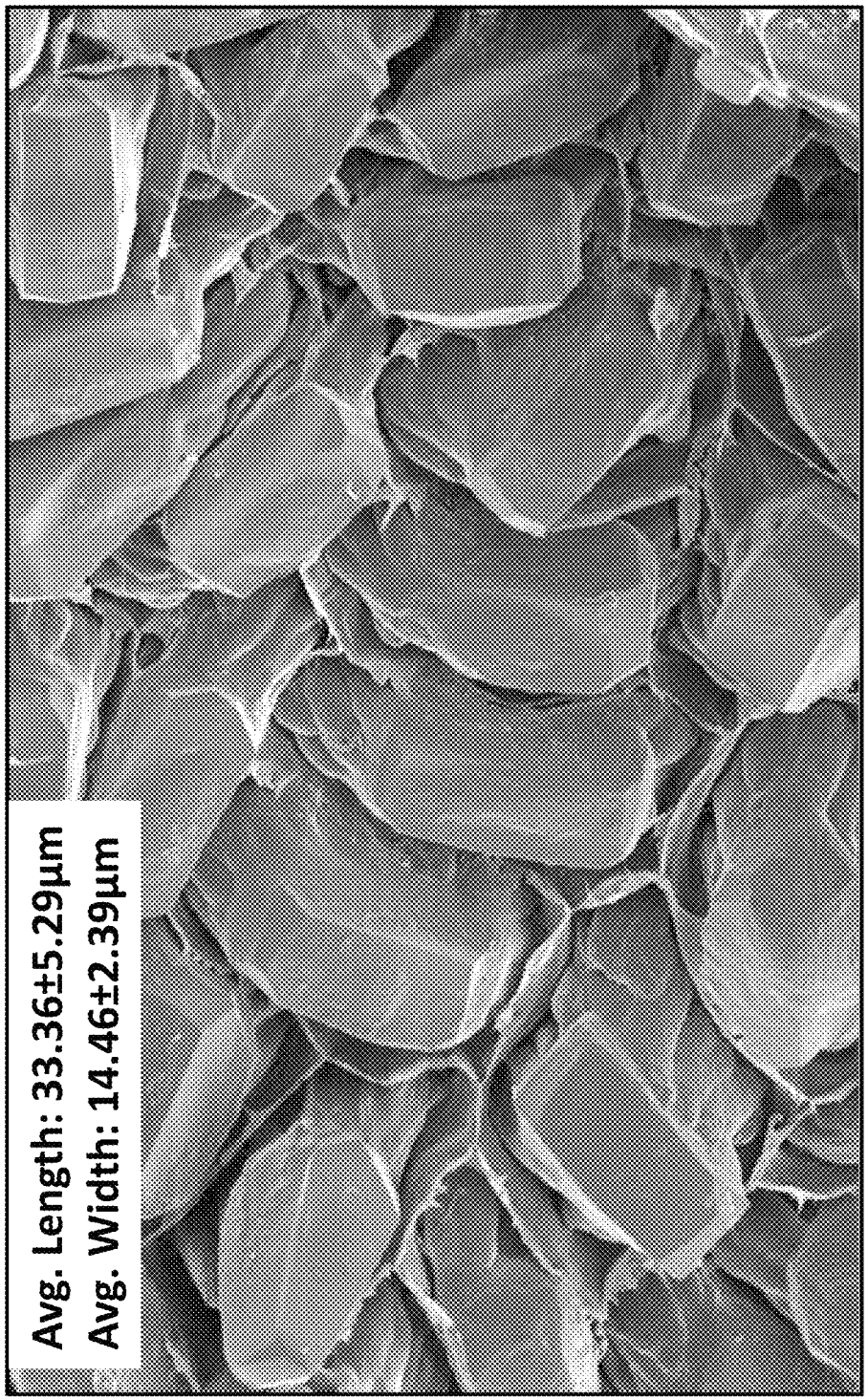
Figure 24:
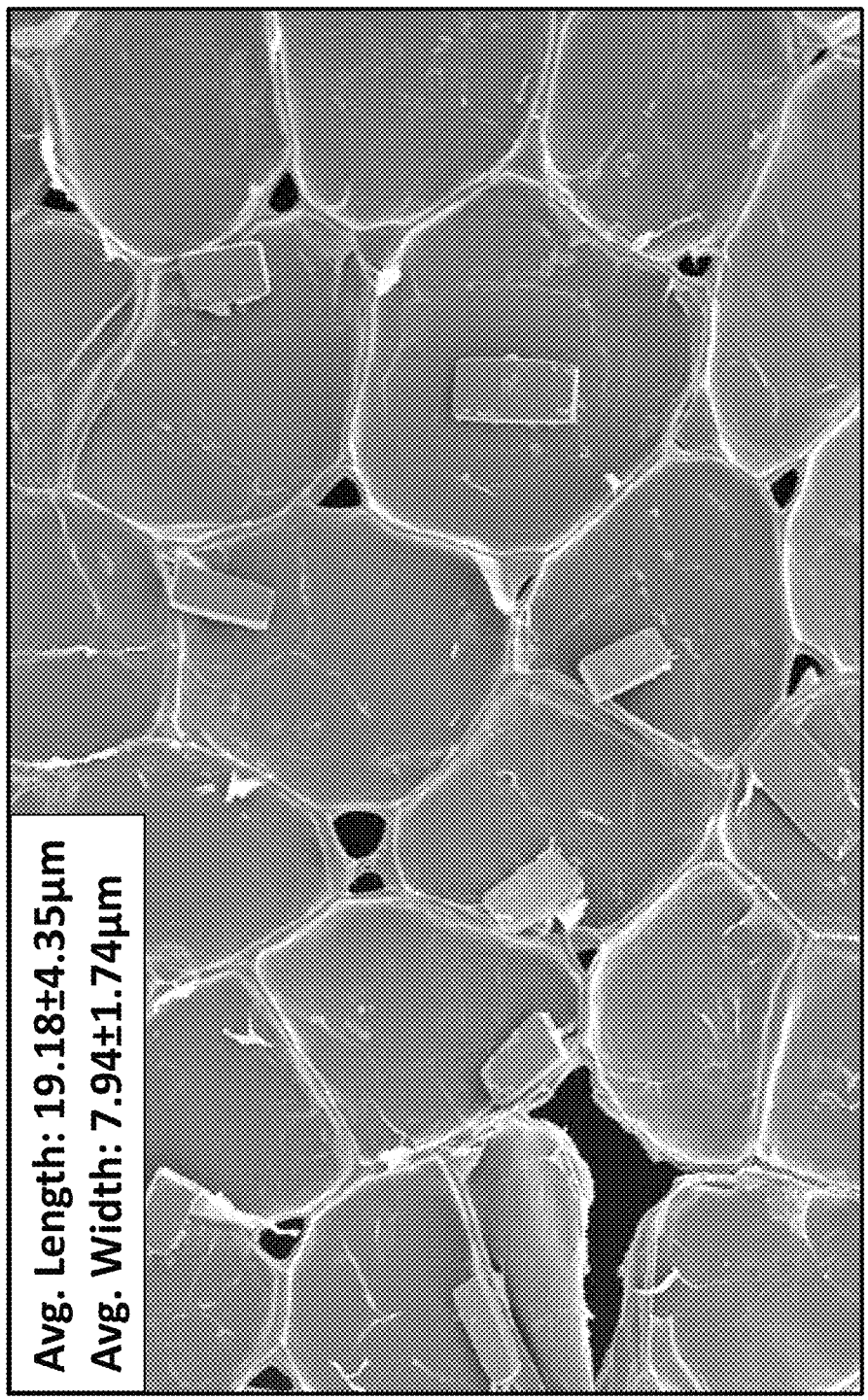
Figure 25:
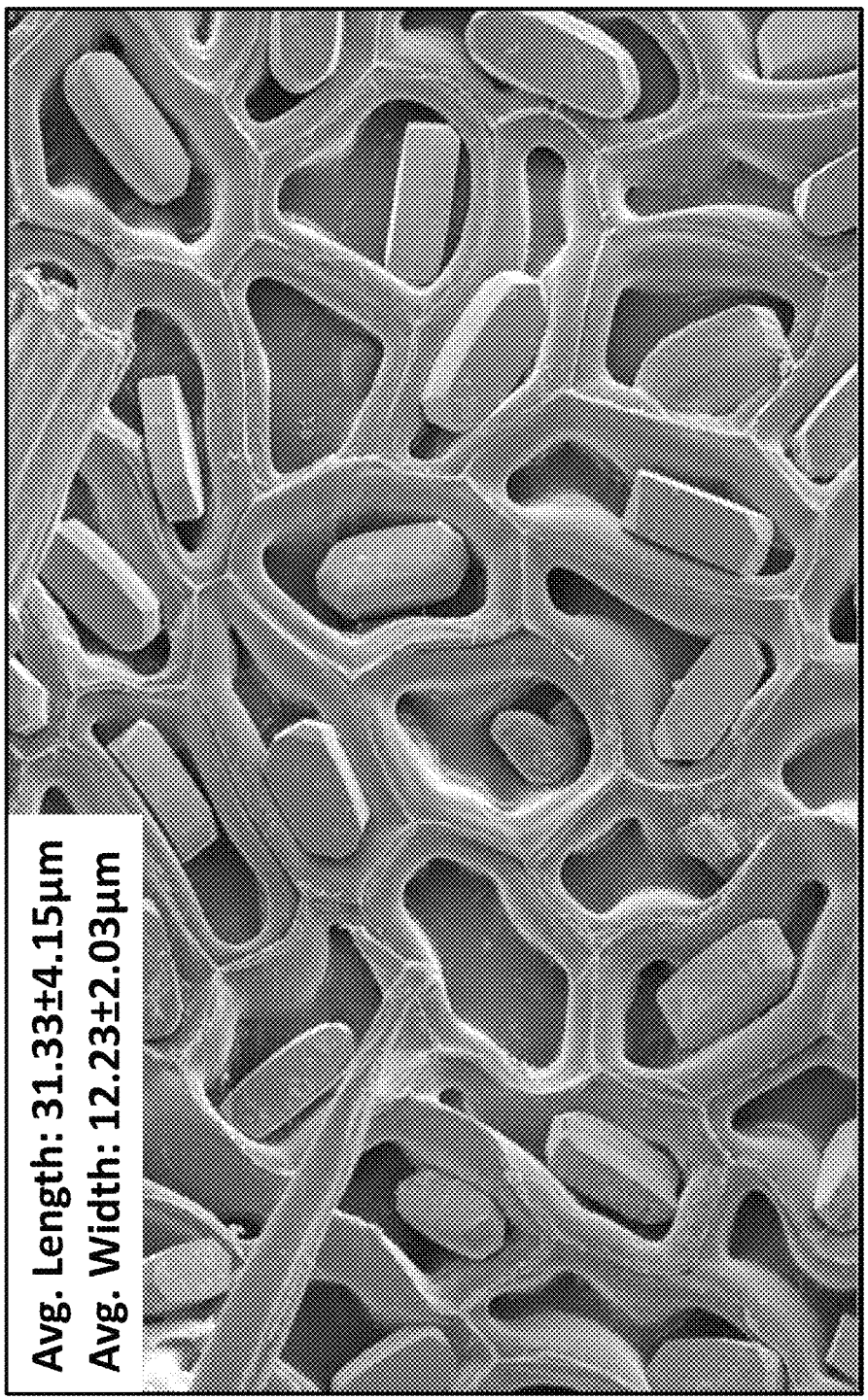

FIGS. 23-25 are image showing platelet growth in accordance with an exemplary embodiment.

Figure 26:
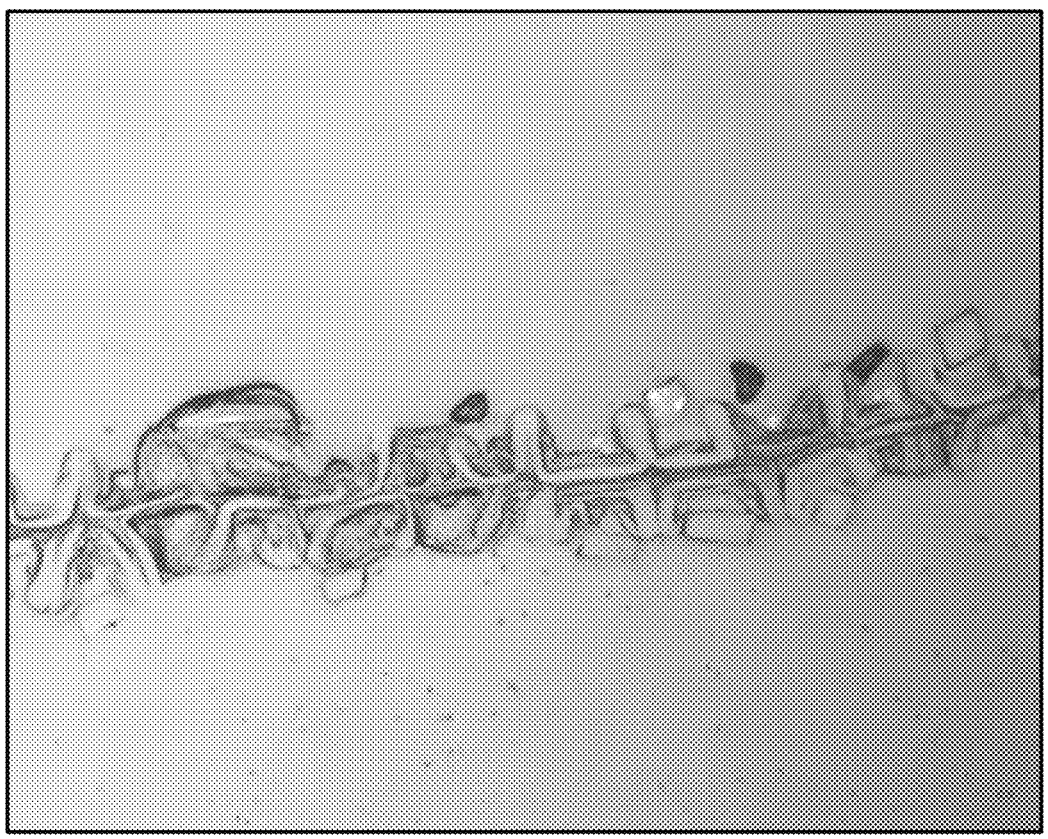
Figure 27:
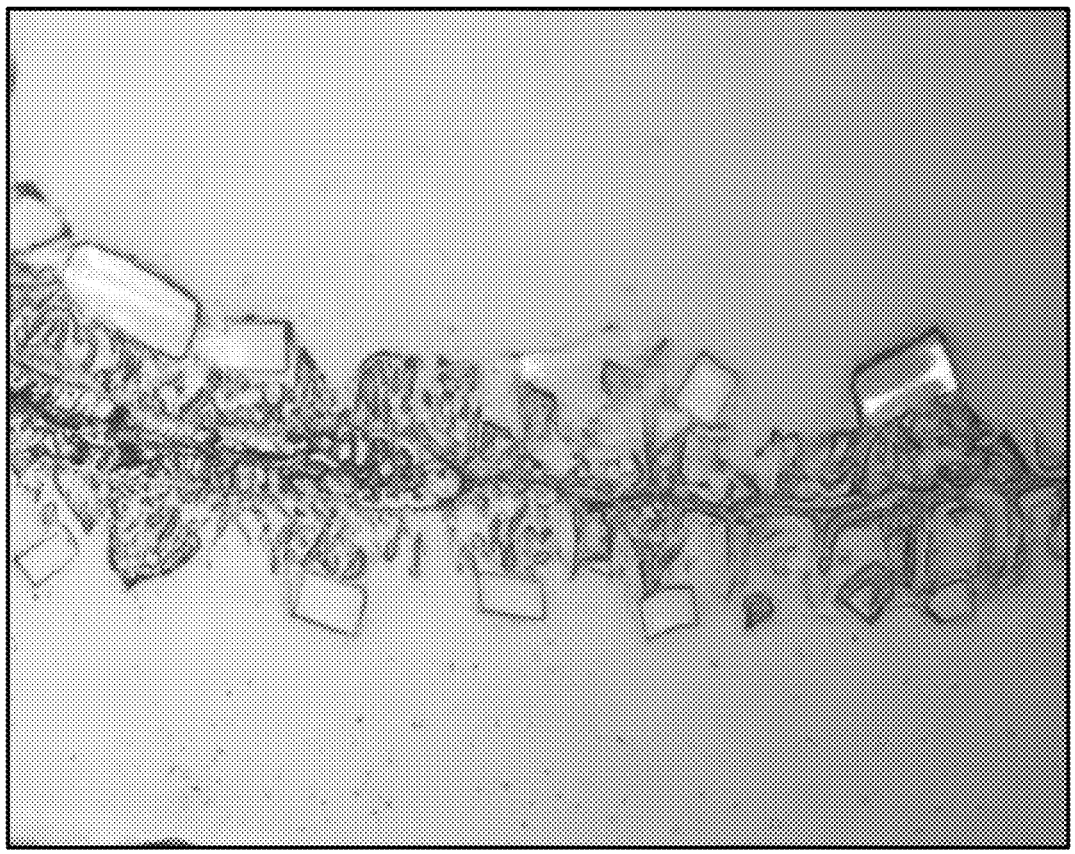
Figure 28:
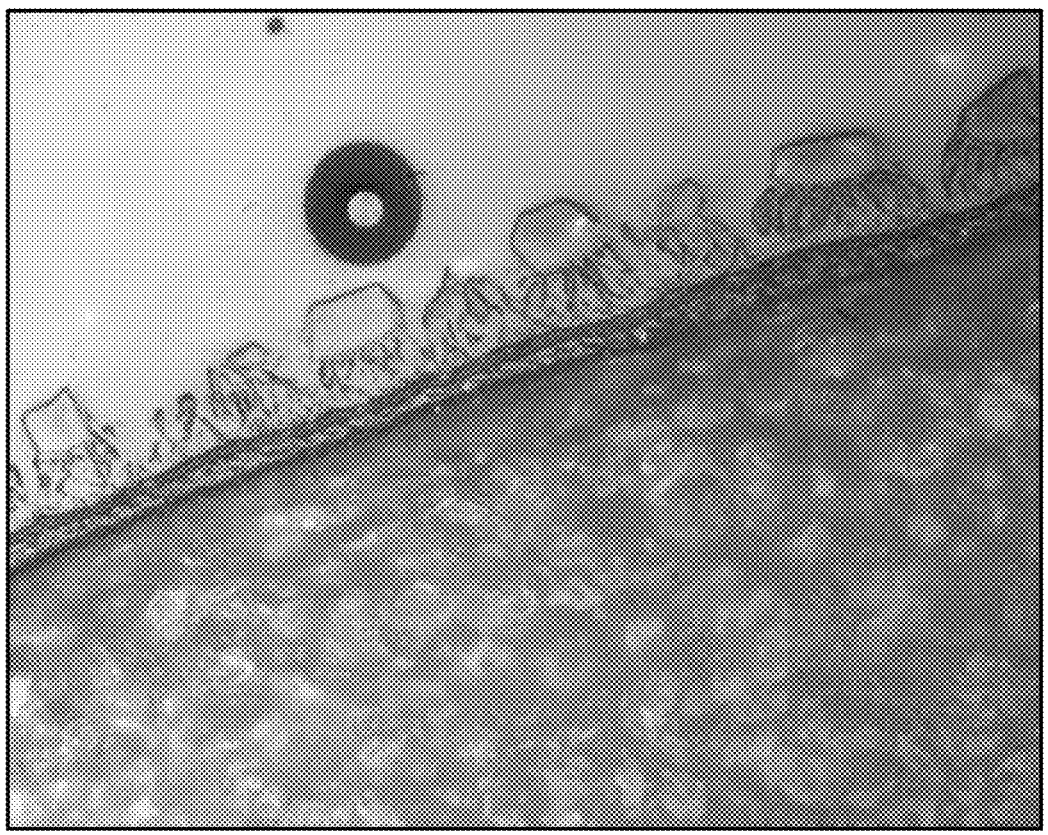

FIGS. 26-28 are images showing calcium oxalate.

Figure 29:
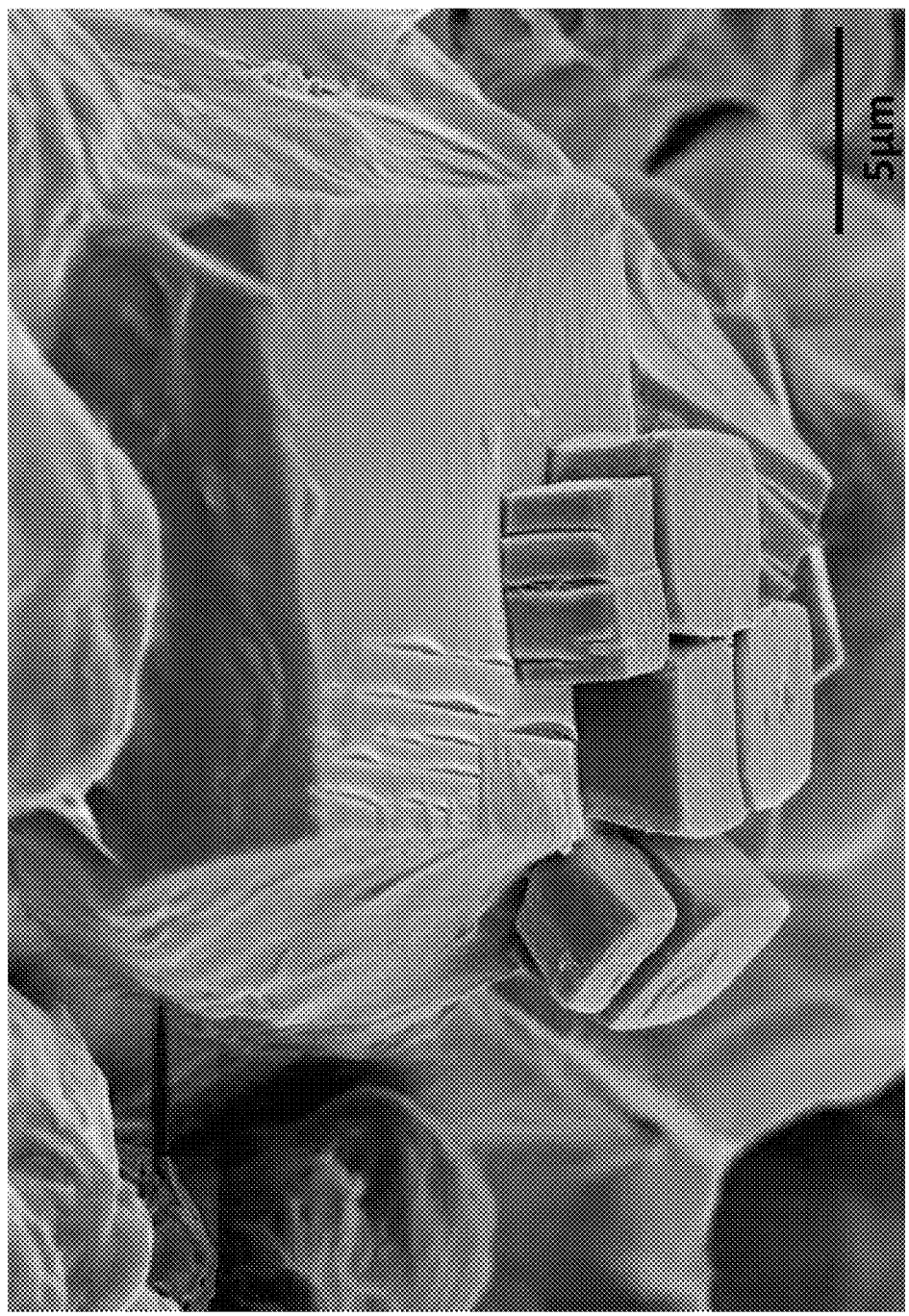

FIG. 29 is an image showing extra growths on Platelets.

Figure 30:
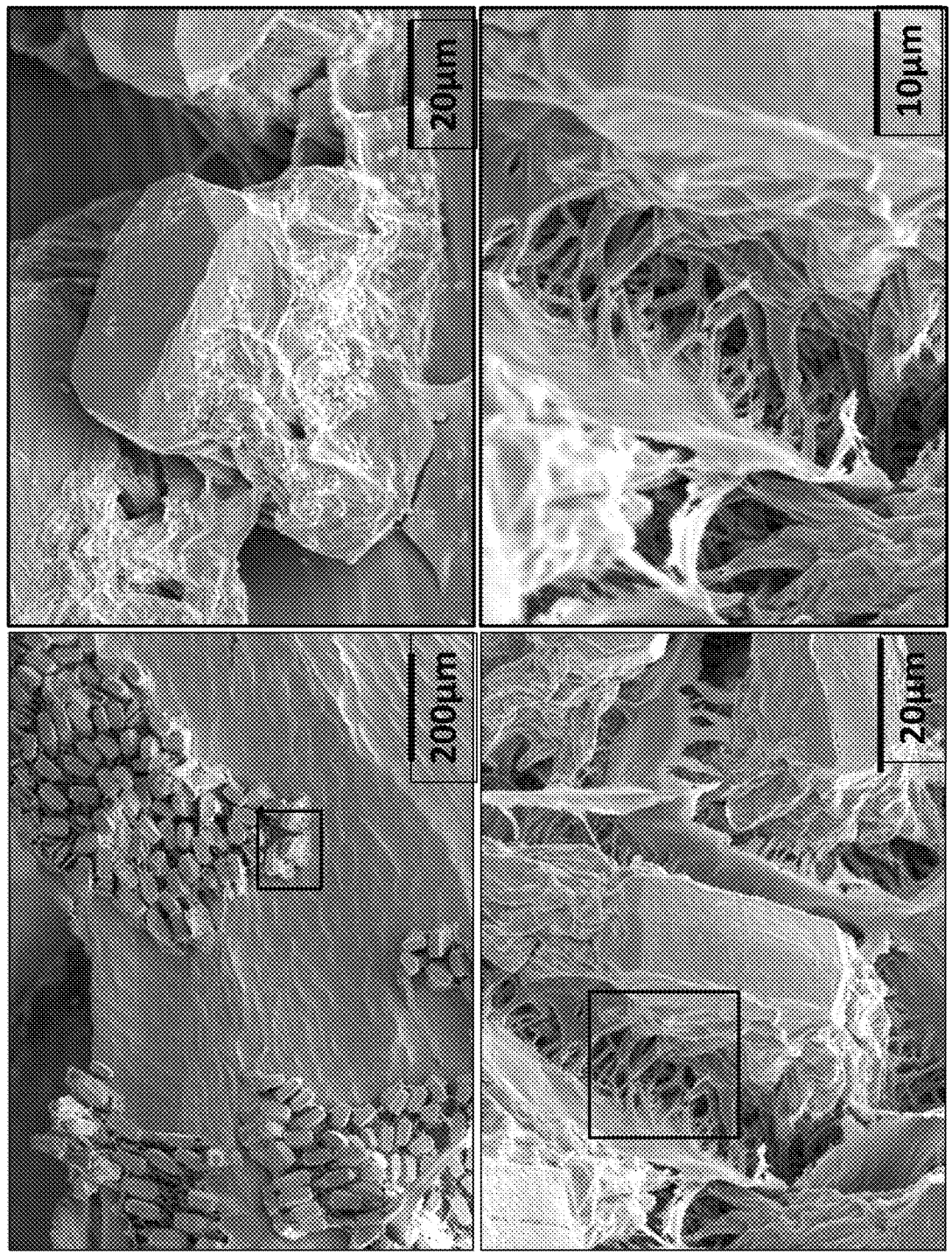

FIG. 30 are images showing an inner structure of the scaffold and platelets.

Figure 31:
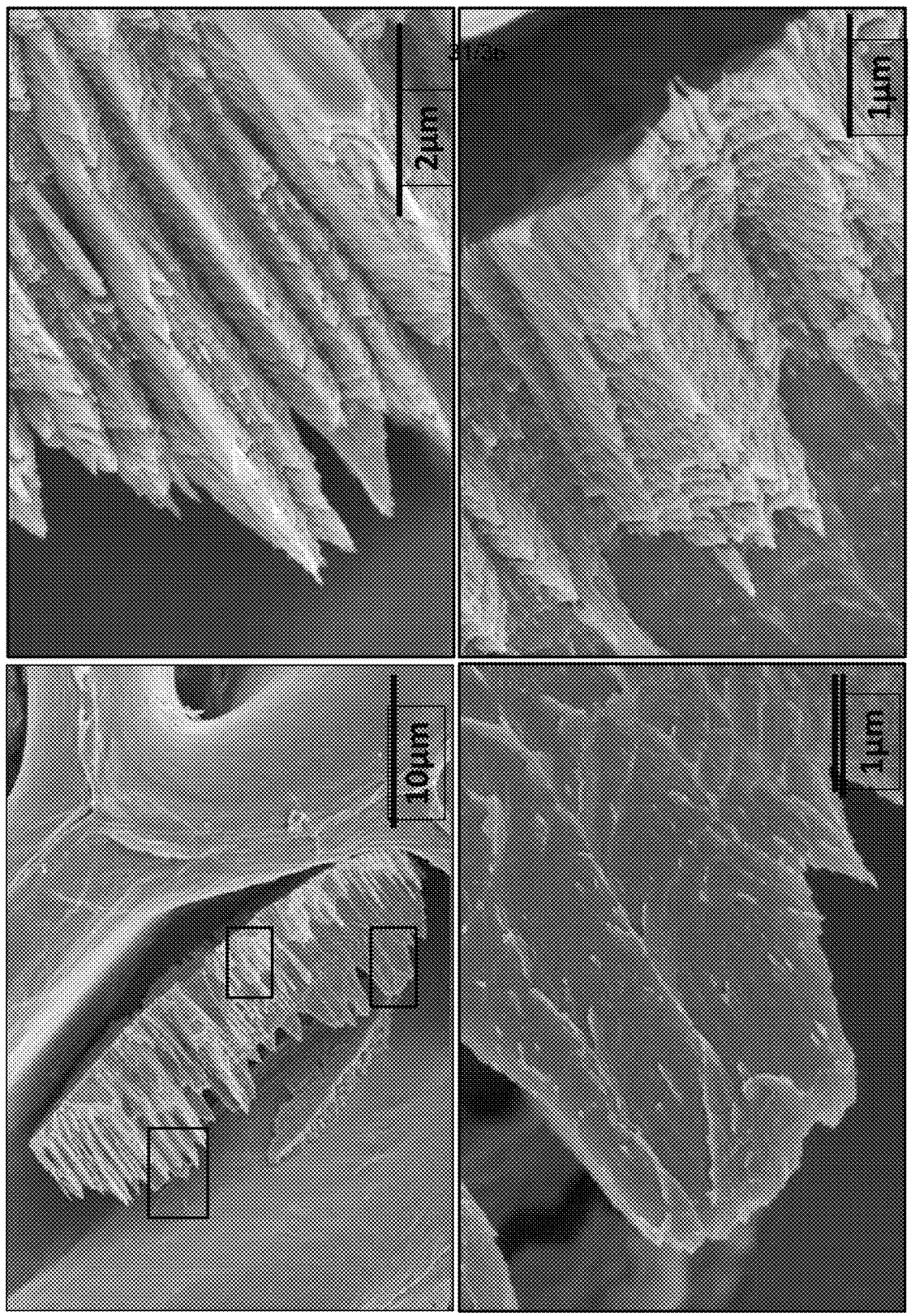
Figure 32:
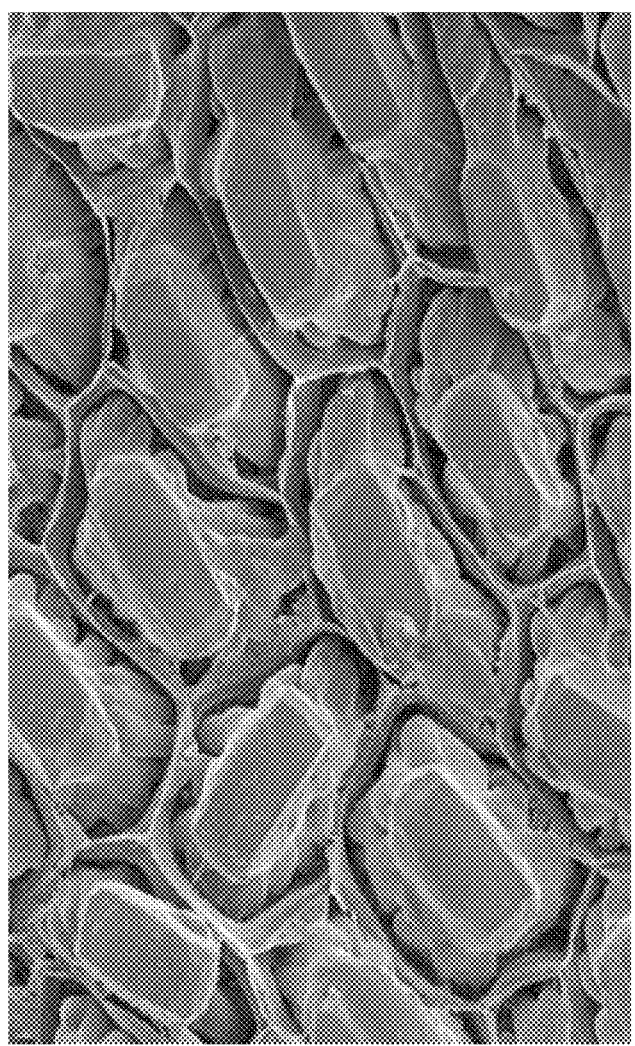
Figure 33:
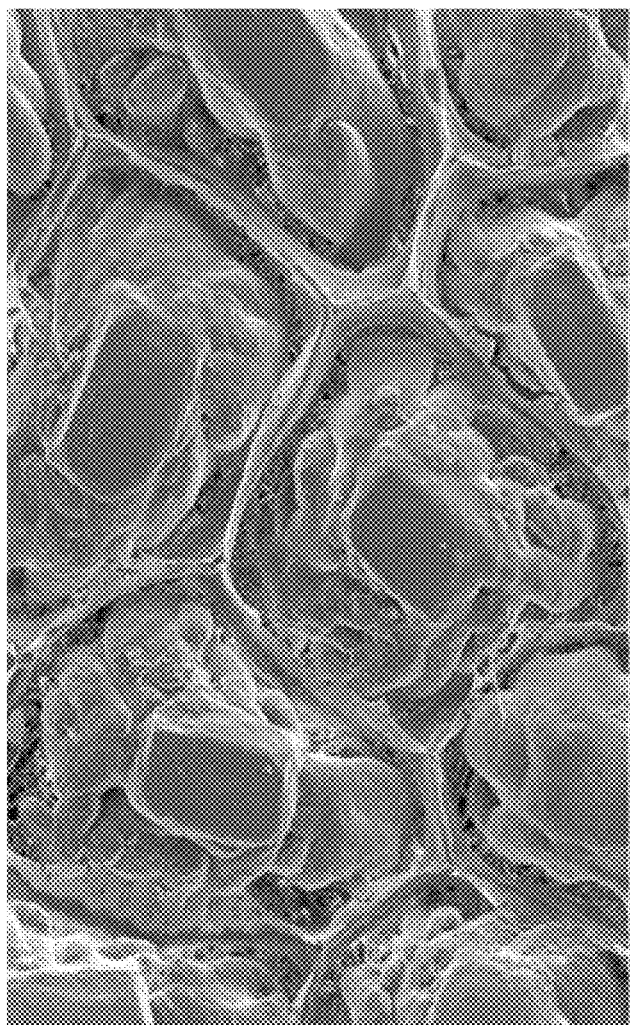
Figure 34:
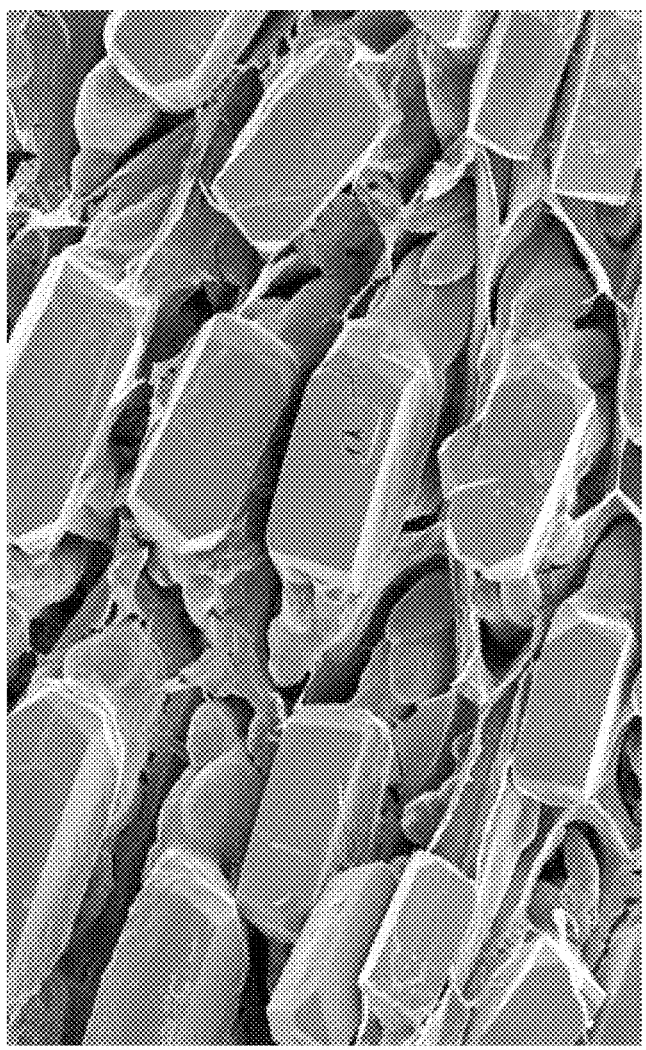
Figure 35:
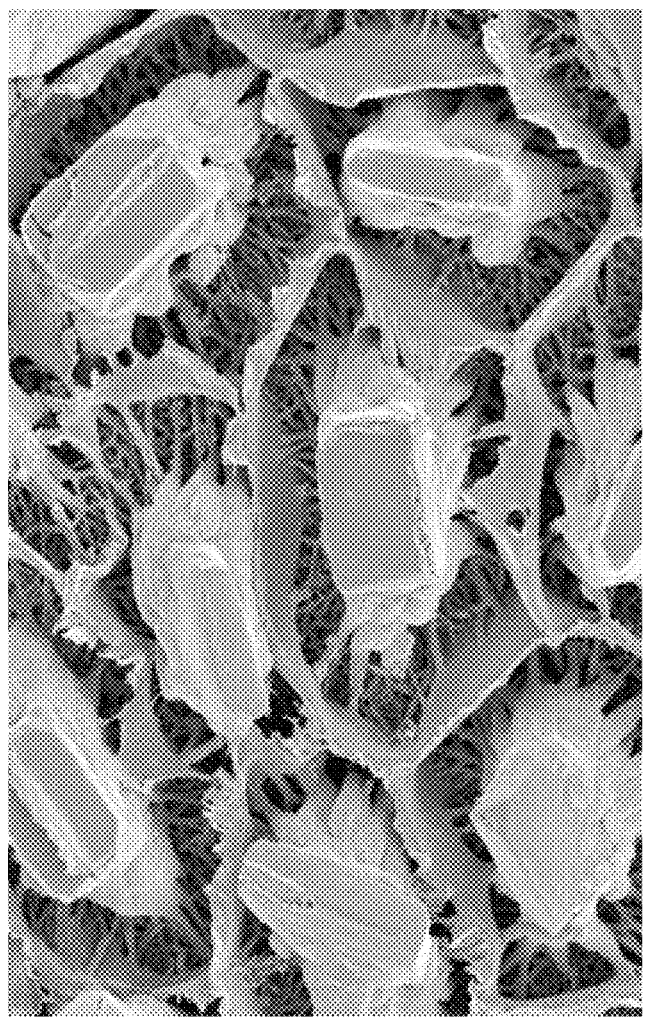

FIG. 31 are images inner microcrystalline structure.

FIGS. 32-35 are images of the effect of high temperature annealing and observation that the organic veneer sheathing the mineral platelets and scaffold begins to degrade, and revealing a highly fibrous substance under the calcium oxalate rhomboids.

Figure 36:
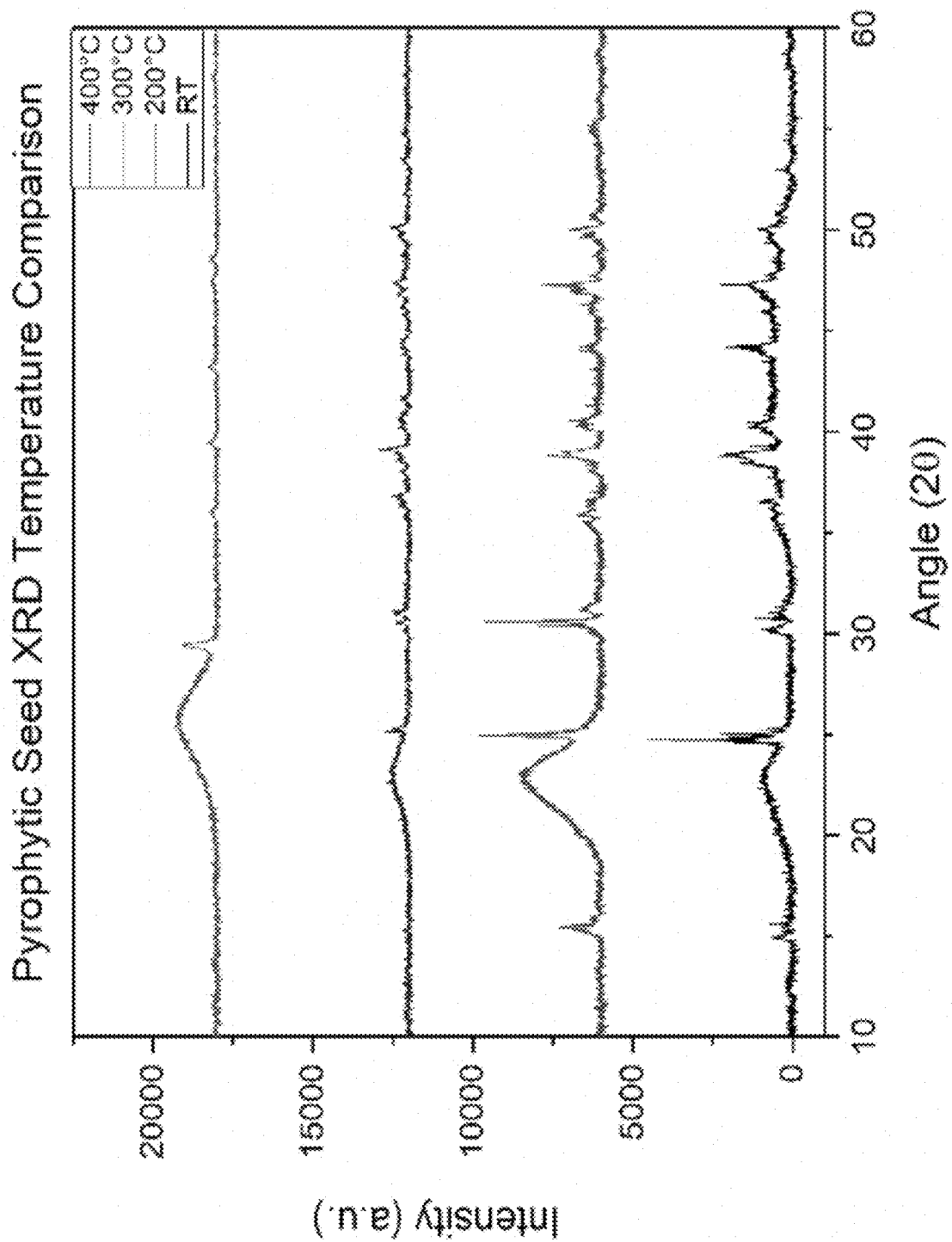

FIG. 36 is chart illustrating Pyrophytic Seed XRD Temperature comparison at 400° C., 300° C., 200° C. and RT.

DETAILED DESCRIPTION

The details of one or more embodiments of the presently disclosed subject matter are set forth in the accompanying description below. Other features, objects, and advantages of the presently disclosed subject matter will be apparent from the specification, drawings, and claims.

In accordance with an exemplary embodiment, multiple design components are disclosed for coatings or thin panels, that absorb significant amounts of heat and thus, reduce thermal conduction that would otherwise induce catastrophic failure to the underlying substrates. These substrates may include biological materials (skin, hair, DNA, etc.), high performance carbon composites, metals and alloys, and/or timber frames used in construction.

In accordance with an exemplary embodiment, these designs were derived through studies of the woody protective seed pods (follicle valves), seed separator, and seeds of a fire resistant plant (*Banksia Speciosa*), all of which demonstrate incredible resistance to thermal failure upon exposure to fires of temperatures greater than about 600° C. Studies have yielded a few design criteria that make this translatable to many applications, including aerospace, automotive, sports, construction, clothing, etc.

In accordance with an exemplary embodiment, the design aspects include (i) sturdy and durable intumescent coatings composed of thermally modifiable polymers and mechanical stiffening elements (for example, ceramic, structural biopolymers such as lignin, etc.) that will expand and bubble, and form a protective pocket of gas (air or other) between the thermal source and the underlying substrate, (ii) bilayer coatings comprised of an additional organic layer (for example, PVA, PAN, biophenols like tannins, etc.), under the intumescent coatings mentioned above, with potential to graphitize in a reducing environment provided by the intumescent bubbles, (iii) architecting multiple thin layers of anisotropic insulating and potentially porous materials to disrupt continuous phonon (thermally induced lattice vibration) transport, (iv) thin coatings composed of metastable material (polymer, ceramic, metal, composite) on the substrate that will absorb heat through endothermic reactions leading to phase transitions, (v) generating sandwiched graphitic sheets between polymeric/composite/ceramic layers, through the use of transition metal ions and nanoparticles, that enable thermal conversion of polymers into ordered graphite, (vi) mechanically and thermally robust ceramic foams filled with reversible phase transitioning waxes that will aid in energy absorption, and (vii) incorporating environmentally friendly aromatic biopolymers, such as lignin and tannins, into 3D printed designs and electrospun nanofibers that could be used to generate flexible wearable fabric.

The aforementioned structural designs provide mechanical toughness along with thermal shielding to ensure durability and improved damage tolerance at hostile temperatures. These designs are lightweight and flexible for use and include nontoxic chemicals/materials that are produced under environmentally benign conditions. The utility of these designs can be translated to make structural materials in aerospace or automotive composites, sports or personal protective gear (for example, armor), construction (building panels that absorb heat), etc.

In accordance with an exemplary embodiment, the coating designs come from the investigation of the fire resistant follicle-seed system of the *Banksia Speciosa*, a fire resistant plant species. This system consists of a woody protective follicle valve encapsulating a protective seed separator membrane and two seeds.

Through analyses performed at the Kisailus Lab (UCR, Riverside, CA), it has been shown that the follicle-seed system is composed of organic/inorganic components, which, in isolation, are thermally and structurally degradable at temperatures less than 500° C.; and yet, on account of their highly efficient heat retarding surfaces and internal designs, survive extended bushfires yielding temperatures of more than 600° C.

In accordance with an exemplary embodiment, the following design strategies were employed by the *Banksia Speciosa* to enable fire resistance:

(1) A waxy intumescent surface coating in the follicle valves, which delaminates from the rest of the valve upon heating, producing localized pores that inhibit flame penetration and reduce phonon propagation by eliminating conductive pathways. This coating is strengthened by the presence of lignified struts;

(2) Variations in the orientation of cellulosic-based crystalline domains that are separated by amorphous matrices (all within the follicle valve and seed separator structures), generating complicated and frustrating pathways for heat transport through phonon scattering and absorption;

(3) Structural evolution of the amorphous organic layer (located beneath the intumescent coating) to dense crystalline carbon, suggested to be thermally insulating. This carbonization process is enabled by the inert environments within the intumescent voids (pores) generated after exposure to fire; and (4) The presence of a thermally absorptive mineral coating on the surface of the seed, which undergoes endothermic phase transitions at high temperatures, protect the vital organic components within the seed.

In accordance with an exemplary embodiment, using the above-mentioned heat resistant designs as inspiration, the following designs are disclosed, which are thermally resistant:

Durable, Mechanically Robust, Intumescent Coatings

Intumescent composite coatings have the potential to retard heat propagation from the fire source through to the substrate by expanding and forming insulating pockets of gas. The coatings can contain thermoplastic, stiff and hard micro-/nano-structural elements embedded in a viscoelastic thermally modifiable matrix. The mechanically stiff reinforcements can either be bulk or hollow vertical columnar elements or inclined struts, composed of either ceramic, metal alloys, graphite, or biophenols. These coatings can also feature hollow/solid cellular foams or particulate additives strengthening the bubbles post-intumescence, such that they don't break apart into small particles when exposed to moisture, gusts of wind, or other loading stresses. Many materials (i.e., waxes, hydrogels, and other viscoelastic polymers, featuring either amorphous or semi-crystalline structures), for example, can be used as the intumescent embedding medium. Along with providing an expanding bubble to thwart phonon transport, these polymer matrices can also absorb a portion of the thermal energy generated from the source of fire to endothermically change its crystallinity/phase, adding yet another way to dissipate heat. Furthermore, the use of reversibly phase transitioning waxes adds to the durability of intumescent coatings for use in environments that may operate at low-to-medium temperatures (from about 100° C. to about 300° C.).

Figure 1:
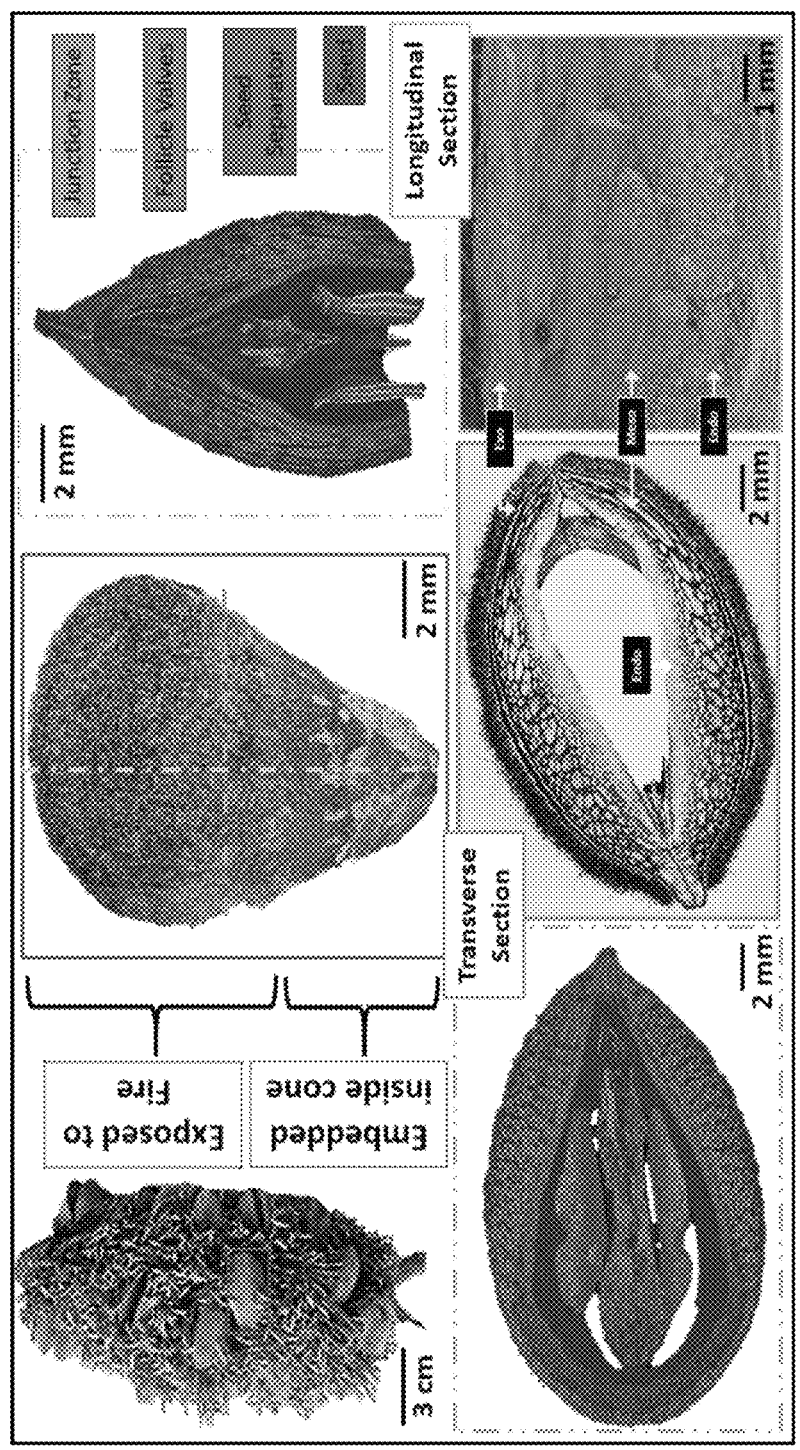
FIG. 1 is a photograph of a *Banksia Speciosa* cone, and its inner cross-section revealing the inner structure—the thermally resistant follicle valve, the seeds encapsulated within the follicle, and the seed separator membrane flanking the seeds.
Figure 2:
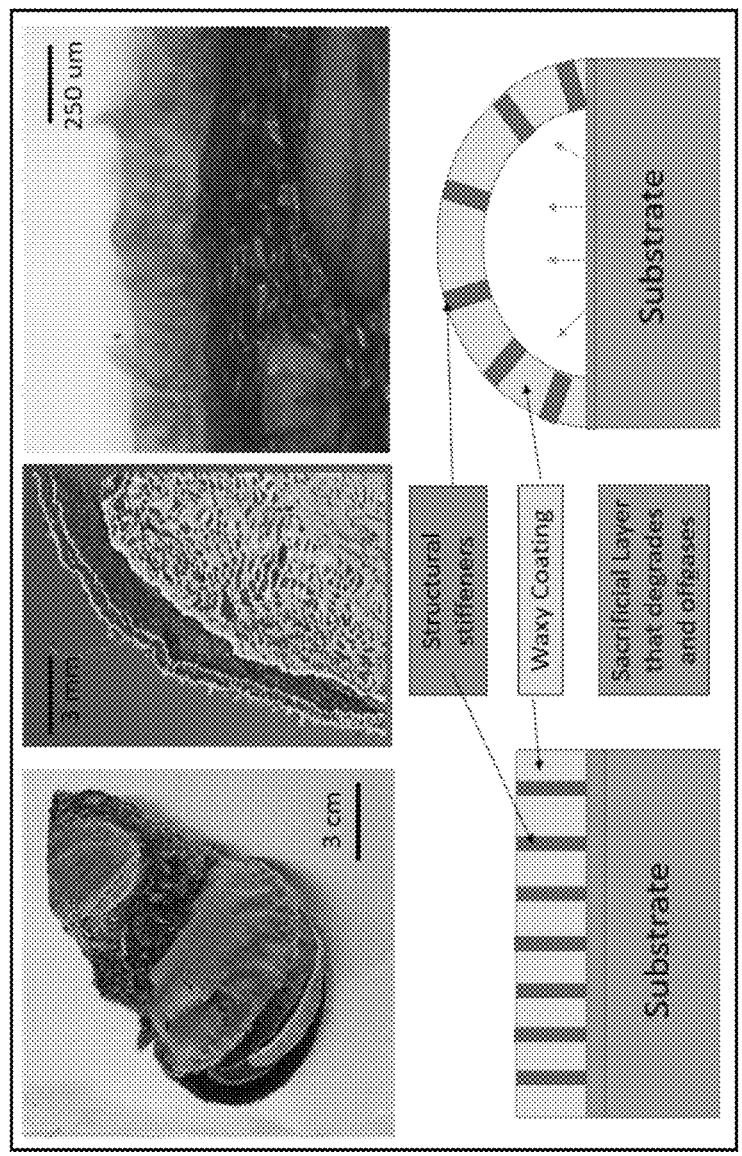
FIG. 2 is an image of the *Banksia Speciosa* follicle post-fire, revealing intumescent expansion of the outermost waxy coating, and wherein the top-right image shows the presence of lignified columns within the coating, and the bottom images are schematics of the intumescent process.

However, other coating materials can be realized to achieve higher thermal stability. An example of how to form these coatings is as follows (FIG. 2):

First, a structural framework was 3D printed composed of either a thermoplastic structural biopolymer like lignin, or a hard mineral like alumina. In order to 3D print lignin, dissolve the lignin in a solvent (usually DMSO or ethanol) at 1 wt %.

If needed, binder material like PLA, ABS, or rubber can be used to attain the desired viscosity value, in order to form 3D printed columns or lattices of desired length and thickness.

After the columnar frames are printed and laid out, the desired thermally modifiable polymer matrix (for example, waxes that melt at about 200° C.) or other polymers (for example 88% hydrolyzed PVA that thermally degrade at about 280° C., solubilized in DI water) was uses as the embedding medium to form an intumescent coating with structural elements.

The thickness of this coating using this method can vary from microns to centimeters, depending on the level of heat it will be exposed to, and the amount of protection required. Other methods used to deposit these coatings, (for example, spin coating, photolithography, etc.) can yield significant thinner coatings (about 1 nm to about 10's of microns).

Depending on the viscoelastic polymer used, a sacrificial layer of organic can be added between the substrate and the composite coating before adhering it (ideally cellulosic microfibers from cotton plant). This will ensure that upon annealing, the sacrificial layer degrades and off-gases, producing volatiles (like furfurals in the case of cellulose) in order to allow for expanding bubbles.

In accordance with an exemplary embodiment, if hot molten wax is used, the hot molten wax can easily adhere onto a substrate. This is unlike other intumescent coatings featuring epoxies that appear to flake off after hardening.

Multiple other structural reinforcements can be used, including metals, alloys, ceramic, etc. The geometries of these reinforcements can vary from being particulate reinforcements can be used, including metals, alloys, ceramic, etc. The geometries of these reinforcements can vary from being particulate columnar, hollow/solid, to being foamy with preexisting interconnected voids.

For example, in accordance with an exemplary embodiment, multiple substrates can be used with different surface roughness, curvatures, and geometries In accordance with another exemplary embodiment, an alternative and simplified method is disclosed:

(1) An organic (for example, oligomer, polymer) with a decomposition temperature tuned between about 110° C. to about 1000° C., and more particularly about 110° C. to about 600° C. can be applied to a substrate using either spin coating or dip coating or spray coating. The thickness of this coating will be dictated by the viscosity of the organic component but should be between about 1 nm and about 1 cm.

(2) On top of layer 1, a waxy layer can be added using dip coating, drop casting, melt spinning, spin coating, spray coating, etc. This wax should have a modifiable viscosity over temperature ranges of use (for example, from about 200° C. to about 1600° C.) that can be tuned to expand as needed to accommodate outgassing.

(3) Upon exposure to heat, the inner layer will decompose and outgas, while the over-layer of wax will soften and enable expansion to afford formation of interlayers of pores filled with gas to reduce thermal conduction. The yield of outgassed material (volume of gas) will determine, in part, the thickness of the pores formed.

Intumescent Bilayer Coatings with an Underlying Sheet of Graphite

Additional thermal shielding can be achieved by adding an insulating graphitic veneer under the intumescent composite coating discussed above. Here, a layer is placed of an organic, such as Polyacrylonitrile (PAN), polyvinyl alcohol (PVA), biopolymers such as plant-based tannin-polysaccharides, etc. of desirable thickness (for example, from about 1 nm to about 10 cm) with a proven ability to graphitize in an inert/reducing atmosphere. Upon exposure to heat/fire, intumescence will occur leaving behind gas pockets. These pockets can contain different gases (air, carbon monoxide, etc.), on account of the annealing of the underlying organic layer in a limited supply of oxygen/air. This reducing atmosphere in conjunction with the high temperatures from the fire will induce the formation of a graphitic layer from the underlying organic, resulting in an intumescent bilayer coating featuring an inner layer of insulating graphite.

Alternatively, for example, transition metal (for example, Fe, Ni or Co) additives (for example, metal salts, metal ions, metal nanoparticles) can be introduced to the PAN, PVA, tannin-polysaccharide biomass layer to ensure the formation of ordered graphite sheets at relatively lower temperatures.

Figure 3:
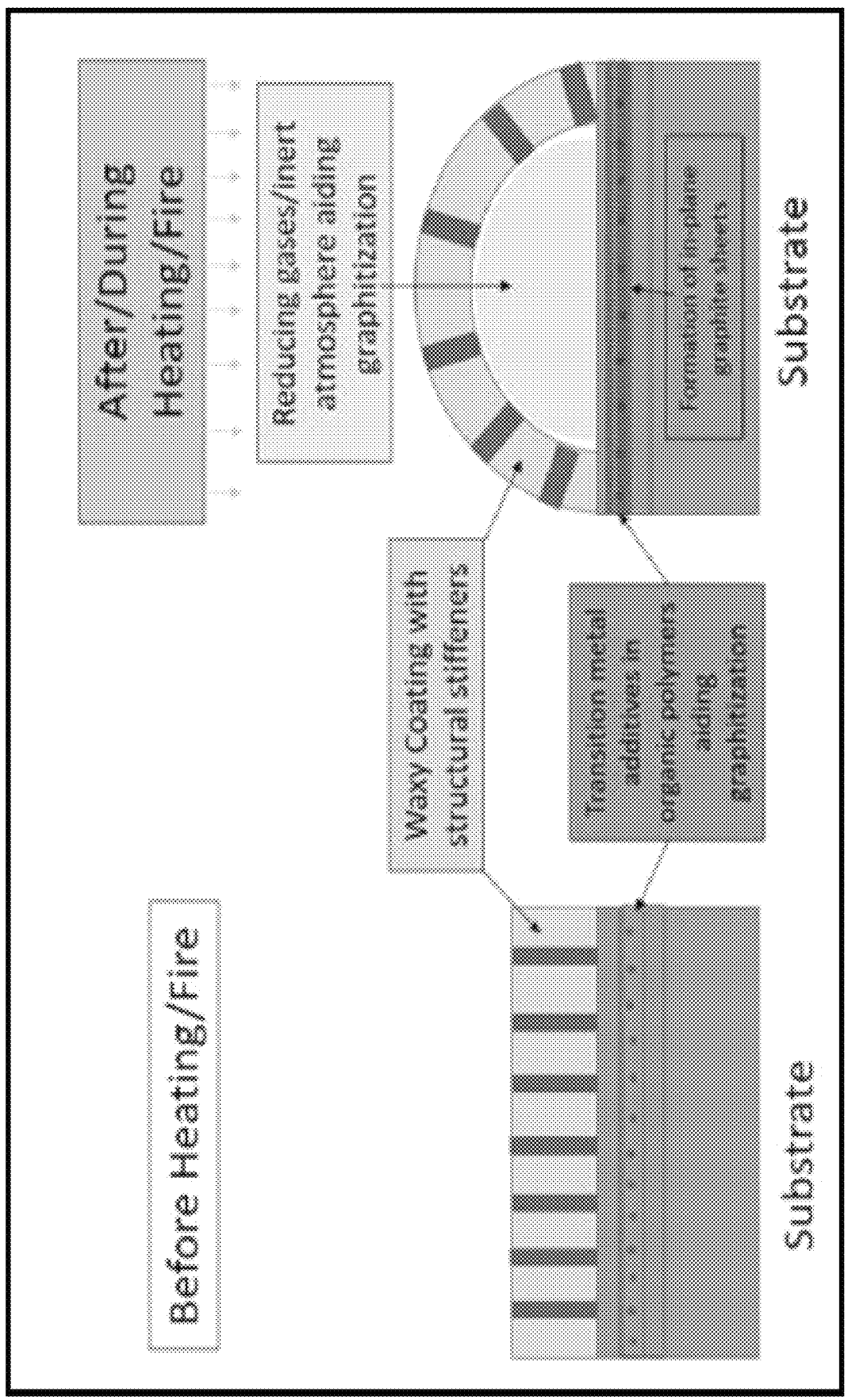
FIG. 3 is a schematic showing the process of a bilayer intumescent coating producing graphite sheets between organic layers.

In accordance with an exemplary embodiment, one example of how to form these layers as shown in FIG. 3 can include:

(1) Dissolve the appropriate polymer (for example, PAN) in a solvent (dimethyl formamide, DMF) at about 1 wt %.
(2) Dip coat (or spray coat) the polymer onto a substrate (for example, a building panel such as a particle board) to achieve the desired thickness (for example, about 10 microns). The concentration of polymer as well as dip coat rate or spray coat time will dictate thickness.
(3) After the first layer is deposited, spray a layer of metal salts in aqueous solution (for example, Ni Acetate, 10% by wt. in water) onto the first layer of polymer. A layer of less than a micron is sufficient but can range from about 1 nm to about 10 microns or more). Additionally, metal nanoparticles can be used in lieu of metal salts or ions. Metals are typically, but not limited to, transition metals such as Fe, Ni, Co, etc.
(4) Add a second layer of polymer on top of the metal ions or nanoparticles. Similar to step 2, Dip coat (or spray coat) the polymer onto the metal ion layer to achieve the desired thickness (for example, about 10 microns).
(5) Multiple layers can be made and do not have to be limited to polymer-metal ion polymer architectures, but can include multiple variations of design and layer thickness.
(6) Multiple substrates can be used of different geometries (not just flat panels but curved structures, fabrics, etc.)

Anisotropic Laminates Featuring Convoluted Thermal Transportation Pathways

In crystalline/semi-crystalline heterogenous materials, thermal conduction takes place through phonon transport, i.e. vibrations along a crystalline lattice. When a phonon approaches an amorphous region, thermal attenuation occurs, disrupting, retarding or stopping its transport. The non-mineralized $B.$ $speciosa$ follicle valve (natural system) uses this strategy of combining highly oriented semi-crystalline polysaccharide and amorphous phenols to generate convoluted pathways for heat dissipation, thus, achieving remarkable fire resistance.

Flame retardation, especially under prolonged heating conditions, can be achieved by designing architected systems (for example, laminated, cellular, helicoidal, etc.) featuring regions (for example, plies in lamellar or helicoidal structures) with anisotropic (aspect ratio—diameter: length—can range from about $10^6$:1 to about 1:$10^6$) polymeric/ceramic/metallic structures (from nanoscale to millimeter scale) that are oriented such that they present obstructing directions (for example, 0°-90°; however multiple geometries in 2 dimensions and 3 dimensions can be realized) for phonon transport, generating a complicated heat transport conduit. Geometries can be arranged such that the crystalline/fiber orientation is in-plane (for example, using anisotropic sheets, see FIG. 4), causing the lateral spread of thermal damage versus through-thickness. However, multiple arrangements can be used depending on how heat needs to be dissipated. The idea is that the orientations of domains can be used to direct phonon transport. These domains can be combined with surrounding matrices (for example, amorphous regions, particle additives, pores containing gases and/or water) that will further frustrate phonon transport and will lead to enhanced thermal protection.

In accordance with an exemplary embodiment, one example of how to form these anisotropic layers is as follows:

(1) Make a suspension of highly anisotropic ceramic or glass (for example, $SiO_2$ fibers) nanowires in an aqueous polymer matrix. (PVA) at about 10 wt % (can range from about 1 wt % to about 90 wt % or up to maximum viscosity).

(2) Print layers using a 3D printer. The rate of deposition will depend on the viscosity and desired thickness. Alternatives here include using Langmuir-Blodgett coating, spin coating, dip coating, melt spinning, electrospinning, centrifugal jet spinning, spray coating, etc.

(3) Subsequent layers can be added, with rotation of the printer or underlying substrate to achieve the desired orientation. 3D printers can be used to enable 3 dimensional orientations.

(4) Many anisotropic materials can be used: polymers, biological polymers, ceramics, glasses, metals, composites, etc.

(5) Aspect ratios can range from about $10^6$:1 to about 1:$10^6$ (6) Matrices can be water, polymers, ceramic or metallic precursors (yielding multiple types of matrix materials and even interphase reacted materials between the fiber and matrix to avoid delamination).

Energy Absorptive Phase Transitioning Coatings

As mentioned before, the seeds of the *B. Speciosa* plant feature a thin surface layer of mineral that, when exposed to high heat, endothermically phase transitions to metastable and stable forms, resulting in energy absorption. This phase change process absorbs a significant portion of the heat energy generated by the fire source, thus, ensuring that the underlying organic (seed DNA, protein, etc.) is undamaged. Inspired from this design, a coating featuring metastable materials such as non-flammable hydrous salts, organic polymers, metastable ceramic or metallic materials, with a high thermal tolerance can be placed at critical regions of structures (i.e., directly in contact with the thermal source or buried within the structure). To improve mechanical toughness of these coatings, one can fabricate organic-inorganic composite phase transitioning coatings to absorb additional energy. These coatings, through endothermic phase transitions, will lead to further flame resistance and thermal insulation. The presence of waxes and lipids will enable reversible phase transformation.

These coatings can be prepared using a number of techniques. For example, it has been shown that the spin coating of inorganic precursors and anneal to temperatures that yield metastable phases can be used. Alternatively, 3D printing can be used to make pre-architected designs or electrospinning to make lignin-lipid membranes, and/or ceramic-lipid coatings. Furthermore, one can also use functionalized self-assembled monolayers (SAMs) of organic molecules to grow oriented crystals of silicon carbide, boron nitride, calcium oxalate, attached at a certain crystalline facet, on required substrates. Using computer-based simulations, one can discern which crystalline facet is most thermally resistant (or hard and abrasion resistant, depending on the application) and ensure that facet is exposed to heat and mechanical loads.

Existing heat shields lack durability, mechanical sturdiness, and structural stability when exposed to prolonged heat/fire. Novel fire resistant coating designs are disclosed, which are inspired by the *B. Speciosa* plant, which are capable of improving damage tolerance, both due to thermal and mechanical stresses.

A major drawback with existing coatings (intumescent or otherwise) is that they employ no architectural elements to dissipate heat energy. In accordance with an exemplary embodiment, coatings are disclosed, which are carefully architectured coatings employing frustrated phonon pathways that will decrease the rate of heat propagation and thus, the probability of catastrophic failure under thermal stresses is relatively low. Furthermore, by incorporating both inorganic and organic components, coatings can be created that retard both thermal transport and crack propagation, producing structures that are stable under creep loads. In accordance with an exemplary embodiment, for example, these materials can then be used to fabricate jet engine blades, which currently are made of single crystal super alloys, which prove to be both expensive to manufacture and extremely susceptible to uninhibited crack growth.

Overall, the coatings will make protective structures and devices safer by inhibiting flame penetration to the substrate underneath. Using the designs to create lightweight insulated wearable fabric will reduce the heat felt by the wearer, and make firefighter uniforms, as well as armor, comfortable and ergonomic. Another benefit is that this invention relates to structural designs, and thus, numerous materials can be employed as needed, based on the application and operating temperatures.

In accordance with an exemplary, mechanisms of phonon inhibition in the biological system have been confirmed and the specific advantages of each of the regions mentioned are identified in this disclosure. In addition, the thermal conductivity of this organism has been measured versus other plant structures and demonstrated its enhanced thermal resistance. In accordance with an exemplary embodiment, the ability to make inorganic coatings of metastable ceramic materials (for example, anatase phase TiO2, which transforms to rutile), but are continuing to pursue lower temperature materials that require large endothermic reactions to transform has been demonstrated. In addition, the ability to transform amorphous polymer to graphitic structures but are now attempting to place these graphitic structures in a lamellar based structure has been demonstrated. Furthermore, models have been used to demonstrate the benefit of placing anisotropic materials, orthogonally to one another, on reduced thermal transport.

In accordance with an exemplary embodiment, optimization parameters such as material selection, thickness of coating, volume/weight fractions of material components, etc., were obtained, for example, by utilizing spin coating, 3D printing and electrospinning to create unidirectional composite coatings. These coatings will be applied to construction wood, metals, fabric, etc. and tested with a Bunsen burner for time intervals ranging from a few seconds to about 2 hours to about 5 hours to gauge performance under fire/heat, short burns and creep caused by prolonged exposure. In addition, renewable/reusable material-based structures can be used; for example, lignin "waste" produced during biofuel generation to make heat resistant coatings can be used.

As set forth above, fire related catastrophes devastate the lives and properties of millions of people each year, necessitating the development of lightweight fire-resistant protective materials. In accordance with an exemplary embodiment, the inspiration for such materials can be found in pyrophytic plants, which have evolved protective architectures to shield their seeds and vasculature from thermal damage as shown in FIGS. 7-36. As set forth, one such structure is a unique phase-transforming biomineralized coating on the surface of pyrophytic seeds that potentially exhibit an energy absorbing utility during a forest fire (FIG. 6).

In accordance with an exemplary embodiment, Scanning Electron Microscopy (SEM) identified the presence of tetragonal platelets on the surface of two pyrophytic seeds. Electron Dispersive X-ray Spectroscopy (EDS) mapping revealed that the platelets were calcium-rich. Powdered X-ray diffraction (XRD) identified the platelets to be calcium oxalate biominerals (phase: monohydrate). In both pyrophytic species, the platelets are templated across the seed surface by an organic scaffold. Calcium oxalate monohydrate is also identifiable in a non-pyrophytic species using XRD.

In accordance with an exemplary embodiment, there was no indication of calcium oxalate on the surface of non-pyrophytic species by SEM and EDS. Optical imaging of a cross-section reveals a biomineralized coating under an epithelial organic layer. This difference in placement suggests that the calcium oxalate has a different utility in pyrophytic and non-pyrophytic seeds.

Calcium oxalate is thermodynamically metastable and undergoes phase changes under approximately (~) 200° C.; the same temperature that most plant organics begin to degrade. Calcium oxalate is formed in most higher plant species either in the monohydrate or dihydrate phase, depending on plant genetics. In plants, the mineral is mainly used as a means of calcium ion detoxification, although it may also be used as a defense against herbivorous or granivorous predators, or, in pyrophytic seeds, a defense against forest-fires.

In accordance with an exemplary embodiment, the crystals appear to grow in size, going from the seed wing region to the inner region featuring the inner organic components of the seed. The crystals on the inner region are more reinforced by a fibrous substrate, as well as feature an organic veneer Calcium oxalate is formed in plants when a mixture of calcium ions and oxalic acid are pumped into specialized cells called idioblasts. For externally formed platelets, for example, the mixture is pumped to the seed surface into a thin organic sheath, which could lead to the formation of excess growths on a platelet's surface, possibly due to the mixture pushing out of deformations in the organic sheath.

Organic sheaths are primarily found covering the platelets in the mid-seed surface. Concurrently, the platelets formed in the transition and wing regions are significantly underdeveloped in comparison, which suggests that the organic sheaths play a role in the growth of the platelets possibly by presenting a larger area for nucleation The platelets in the inner region are fixed to the seed surface by organic scaffolds. Bleaching the seed sodium hypochlorite revealed that the underlying organics holding the platelets are fibrous. Dislocation of the platelets revealed that the scaffolds follow a pattern across the seed surface. The scaffold itself was found to be approximately (~) 30 μm deep and holds onto the bottom half of the platelets.

Demineralization of the platelets with EDTA 8.5 pH buffer revealed the inner microcrystalline structure. This showed a structured growth of the calcium oxalate on a possible template in which the calcium oxalate forms along rows and columns growing across the short face of the platelet. Such appearance suggests that the platelets undergo an oriented attachment; which will be further investigated using TEM Upon annealing the seeds in a muffle furnace to 400° C., it was observed that the organic veneer sheathing the mineral platelets and scaffold begins to thermally degrade, revealing a highly fibrous substrate under the calcium oxalate rhomboids, possibly functioning as mineral transport channels In pyrophytic plants, calcium oxalate is secreted in the monohydrate phase. Upon annealing to approximately (~) 400° C., calcium oxalate monohydrate is known to endothermically phase transform to calcium carbonate, as is confirmed in the powder-XRD spectra on the right, and to calcium oxide at approximately (~) 800° C. This energy absorptive phase transition preserves the vital inner organic components (for example DNA, proteins, etc.) when exposed to forest fires.

Unless otherwise indicated, all numbers expressing quantities of ingredients, properties such as molecular weight, reaction conditions, and so forth used in the specification and claims are to be understood as being modified in all instances by the term "about." As used herein, the term "about" means that the item, parameter or term so qualified encompasses a range of plus or minus ten percent above and below the value of the stated item, parameter or term. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed considering the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein is intended merely to better illuminate the invention and does not pose a limitation on the scope of the invention otherwise claimed. No language in the specification should be construed as indicating any non-claimed element essential to the practice ant of the embodiments disclosed in the present disclosure.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It is to be understood that the embodiments of the invention disclosed herein are illustrative of the principles of the present invention. It should be understood that the disclosed subject matter is in no way limited to a particular methodology, protocol, and/or reagent, etc., as described herein. Various modifications or changes to or alternative configurations of the disclosed subject matter can be made in accordance with the teachings herein without departing from the spirit of the present specification. Accordingly, the present invention is not limited to that precisely as shown and described.

What is claimed is:

1. A multimodal coating, the multimodal coating comprising:
   a medium;
   a structural framework embedded in the medium forming an intumescent coating, the intumescent coating configured to undergo intumescent expansion of an outermost coating of the medium upon heating; and
   a metastable material, the metastable material including calcium oxalate, and wherein the metastable material is configured to absorb heat through endothermic reactions as the metastable material undergoes phase transitions.

2. The coating according to claim 1, wherein the structural framework is a one or more of a mechanical stiffening element, the mechanical stiffening element being selected from a ceramic and a structural biopolymer.

3. The coating according to claim 2, wherein the structural biopolymer is lignin.

4. The coating according to claim 1, wherein the medium is a thermally modifiable polymer matrix, the thermally modifiable polymer matrix being a wax or hydrolyzed polyvinyl alcohol (PVA).

5. The coating according to claim 1, further comprising:
   a substrate configured to receive the multimodal coating; and
   an organic layer under the intumescent coating and on an upper surface of the substrate.

6. The coating according to claim 5, wherein the organic layer is polyvinyl alcohol (PVA), Polyacrylonitrile (PAN), a biopolymer, plant-based tannin-polysaccharides, and/or a biophenol, and wherein the organic layer is configured to graphitize in a reducing environment provided by intumescent bubbles.

7. The coating according to claim 6, further comprising:
a transition metal or an additive in the organic layer, wherein the transition metal is one or more of iron (Fe), nickel (Ni), and cobalt (Co), and the additive is one or more of metal salts, metal ions, and metal nanoparticles.

8. The coating according to claim 6, comprising:
a plurality of alternating layers of the organic layer and the intumescent coating.

9. The coating according to claim 5, further comprising:
a plurality of layers of anisotropic insulating and potentially porous materials configured to disrupt continuous phonon transport, the plurality of layers of the anisotropic insulating and potentially porous materials including a suspension of anisotropic ceramic nanowires or glass nanowires in an aqueous polymer matrix.

10. The coating according to claim 1, wherein the structural framework comprises one or more of metals, alloys, and ceramics, and the structural framework has a geometry comprising one or more of a particulate, columnar, a hollow shape, a solid shape, and a foamy geometry with preexisting interconnected voids.

11. The coating according to claim 5, wherein the substrate is a plurality of substrates, the plurality of substrates having different surface roughness, curvatures, and geometries.

12. The coating according to claim 1, where the metastable material further comprises:
one or more of a metastable phase of a metal oxide, a carbide, a nitride, a phosphide, a sulfide, an oxalate, an anatase phase $TiO_2$, silicon carbide, and boron nitride.

13. A method of coating a substrate with the multimodal coating of claim 1, the method comprising:
generating the medium;
embedding the structured framework in the medium forming the intumescent coating;
adding the metastable material on the substrate; and
adding waxes to assist with a reversible phase transitioning of the metastable material.

14. The method according to claim 13, wherein the structural framework is a mechanical stiffening element, the mechanical stiffening element being a ceramic or a structural biopolymer, and wherein the medium is a thermally modifiable polymer matrix, the polymer matrix being a wax or hydrolyzed polyvinyl alcohol (PVA), the method further comprising:
depositing the multimodal coating on the substrate; and
depositing an organic layer under the intumescent layer and on an upper surface of the substrate, where the organic layer has the potential to graphitize in a reducing environment provided by the intumescent bubbles.

15. The method according to claim 14, wherein the organic layer is selected from one or more of the following: polyvinyl alcohol (PVA), polyacrylonitrile (PAN), a biopolymer, plant-based tannin-polysaccharides, and a biophenol, the method comprising:
graphitizing the organic layer in a reducing environment provided by intumescent bubbles; and
adding a transition metal or an additive to the organic layer, and wherein the transition metal is one or more of Iron (Fe), Nickel (Ni), or Cobalt (Co), and the additive is one or more of metal salts, metal ions, and metal nanoparticles.

16. The method according to claim 15, further comprising:
adding a plurality of layers of anisotropic insulating and potentially porous materials, whereby the layers of anisotropic insulating and potentially porous materials disrupt continuous phonon transport;
sandwiching transition metal ions and nanoparticles between polymeric/composite/ceramic layers, and wherein the transition metal ions and nanoparticles are configured to enable thermal conversion of polymers into ordered graphite; and
adding ceramic foams filled with reversible phase transitioning waxes.

17. The method according to claim 16, wherein the adding the plurality of layers of anisotropic insulating and potentially porous materials comprises:
suspending anisotropic ceramic nanowires or glass nanowires in an aqueous polymer matrix; and
depositing the ceramic nanowires or the glass nanowires in the aqueous polymer matrix on substrate by using 3-D printing, Langmuir-Blodgett coating, spin coating, dip coating, melt spinning, electrospinning, centrifugal jet spinning, or spray coating.

18. The method according to claim 16, further comprising:
generating a flexible wearable fabric by adding aromatic biopolymers into 3D printed designs and electrospun nanofibers.

19. A method of coating a substrate with the multimodal coating of claim 1, the method comprising:
applying an organic with a decomposition temperature tuned between 110° C. to 1000° C. to the substrate, the organic being an oligomer; and
adding a waxy layer of a reversible phase transitioning wax on an upper surface of the organic, and wherein the organic forms an inner layer, and wherein upon exposure to heat, the inner layer decomposes and outgases, and wherein the waxy layer is configured to soften and enable expansion to afford formation of interlayers of pores filled with gas to reduce thermal conduction.

20. The coating according to claim 5, further comprising:
the metastable material includes a plurality of coatings of a metastable material on the substrate;
transition metal ions and nanoparticles sandwiched between the plurality of coatings of the metastable material, and wherein the transition metal ions and nanoparticles are configured to enable thermal conversion of polymers into ordered graphite; and
ceramic foams filled with reversible phase transitioning waxes configured to aid in energy absorption, or aromatic biopolymers, the aromatic biopolymers comprising lignin and tannins in 3D printed designs and electrospun nanofibers.

* * * * *